United States Patent [19]

Swisher et al.

[11] Patent Number: 5,354,829
[45] Date of Patent: Oct. 11, 1994

[54] SILYLATED POLYAMINE POLYMERS AND A METHOD OF TREATING FIBERS

[75] Inventors: Robert G. Swisher, Pittsburgh; Richard P. Beaver, Library; Robert G. Briody; Louis J. Nehmsmann, both of Apollo, all of Pa.

[73] Assignee: PPG Industries, Inc., Pittsburgh, Pa.

[21] Appl. No.: 906,960

[22] Filed: Jun. 30, 1992

[51] Int. Cl.⁵ .............................................. C08G 77/00
[52] U.S. Cl. ...................................... 528/10; 528/26; 528/28; 528/38; 528/59; 528/335; 528/342; 528/345; 525/420; 525/421; 525/435; 525/446; 525/487; 427/387
[58] Field of Search ................. 528/10, 345, 59, 335, 528/342, 28, 26; 525/420, 421, 435, 446, 487; 427/387

[56] References Cited

U.S. PATENT DOCUMENTS

| | | | |
|---|---|---|---|
| 2,292,829 | 3/1960 | Morehouse | 260/448.2 |
| 3,097,963 | 7/1963 | Caroselli | 117/126 |
| 3,159,600 | 12/1964 | Watkins, Jr. | 260/46.5 |
| 3,227,192 | 1/1966 | Griffiths | 139/420 |
| 3,265,516 | 8/1966 | Triplett et al. | 106/213 |
| 3,448,048 | 6/1969 | Le Suer et al. | 252/51.5 |
| 3,597,265 | 8/1971 | Mecklenborg et al. | 117/126 GR |
| 4,002,445 | 1/1977 | Graham | 65/3 C |
| 4,032,549 | 6/1977 | Sharkey et al. | 260/404.5 |
| 4,122,074 | 10/1978 | Pepe et al. | 526/26 |
| 4,152,342 | 5/1979 | Kelyman et al. | 260/404.5 |
| 4,197,349 | 4/1980 | Walser | 428/378 |
| 4,332,737 | 6/1982 | Manos | 260/404.5 |
| 4,455,343 | 6/1984 | Temple | 428/391 |
| 4,548,842 | 10/1985 | Pohl | 427/407.2 |
| 4,584,138 | 4/1986 | Pepe et al. | 260/404.5 |
| 4,659,756 | 4/1987 | Pohl | 523/402 |
| 4,668,716 | 5/1987 | Pepe et al. | 523/213 |
| 4,681,805 | 7/1987 | Puckett | 428/391 |
| 4,728,573 | 3/1988 | Temple | 428/392 |
| 4,775,725 | 10/1988 | De Pasquale et al. | 528/28 |
| 4,775,725 | 10/1988 | DePasquale et al. | 524/403 |
| 4,795,678 | 1/1989 | Girgis | 428/391 |
| 4,950,583 | 8/1990 | Brewer et al. | 430/311 |
| 4,960,844 | 10/1990 | Singh | 528/28 |
| 4,988,778 | 1/1991 | Chang et al. | 528/28 |
| 5,070,168 | 12/1991 | O'Lenick, Jr. | 528/28 |
| 5,130,197 | 7/1992 | Temple | 428/392 |
| 5,130,198 | 7/1992 | Swisher et al. | 428/391 |
| 5,135,992 | 8/1992 | Chang et al. | 528/28 |
| 5,141,802 | 8/1992 | Parrinello et al. | 428/392 |
| 5,247,004 | 9/1993 | Swisher et al. | 524/494 |

OTHER PUBLICATIONS

"Polymeric Silanes: An Evolution in Coupling Agents", 42nd Annual Conference, Composites Institute, the Society of the Plastics Industry, Inc., Feb. 2-6, 1987 by Barry Arkles, et al.

"The Manufacturing Technology of Continuous Glass Fibres" by K. L. Loewenstein, Elsevier Scientific Publishing Company, New York, 1973, pp. 192-193 and 198.

Primary Examiner—John Kight, III
Assistant Examiner—P. Hampton-Hightower
Attorney, Agent, or Firm—Kenneth J. Stachel

[57] ABSTRACT

A polymeric reaction product is disclosed that is a silylated polyamine-containing polymer having moieties from fatty acid moieties and/or chain extenders as difunctional organo moieties and free amine moieties and hydrolyzed and/or hydrolyzable organofunctional silane moieties and that is at least water dispersible. The reactants that produce this product are a polyamine-containing polymer with fatty acid moieties and free amine moieties and at least one amine-reactable organo functional alkoxysilane or its hydrolysis products. The former reactant results from the reaction of a polyamine-containing polymer with free amine moieties with fatty acids alone or in mixtures with other fatty acids and/or dimer acids. The polymeric reaction product is combined with a predominant amount of water to form a fiber treating formulation that can reside on the surface of one or more treated fibers.

40 Claims, No Drawings

SILYLATED POLYAMINE POLYMERS AND A METHOD OF TREATING FIBERS

The present invention is directed to cationic lubricants and silane materials alone and present with other components in treating compositions where these materials can be present on substrates like fibers and the method of preparing the composition and the treated substrates.

Various nonionic lubricants are available for a wide range of uses, but most of them ultimately involve the lubricant in contact with one or more substrates. For instance, nonionic lubricants like hydrogenated vegetable oils and cationic lubricants like partially amidated polyamines and acylated alkyl imidazolines are good fiber lubricants. Fiber lubricants along with other components are formulated into treating compositions for application to the fibers. This composition can be a size in the case of treating glass fibers during their formation to form bundles of fibers or strands. In producing twisted glass fiber strands for yarn, a useful size is a starch oil size. This size provides protection through the rigors of formation of the bundles of fibers or strands and twisting of one or more bundles to form yarn and is removable in a heat treatment step from the finished cloth. In addition, fiber lubricants are useful in sizings that are placed on fibers that reinforce polymeric matrices in the production of fiber reinforced plastics. In this application the size, once again, provides protection and also can provide compatibility between the fiber and the matrix polymer or resin. The lubricant and size components usually contact the fibers during their formation and protect the fibers through subsequent processing steps. These steps can include: the winding of the fibers and stands onto a forming package, drying the aqueous-based or solvent-based size to remove the water or solvent, twisting from one package to a bobbin, beaming to place the twisted yarn onto very large packages ordinarily used as the warp in a fabric, chopping in a wet or dry condition, or roving into larger bundles or groups of strands.

The sizing formulation in such applications must be versatile enough to provide the necessary properties and must have components that are compatible with each other to accomplish the desired properties. For instance, it is known that the use of organo silane ester coupling agents and hydrolyzed derivatives thereof in the size can improve the tensile strength of the sized glass fiber strand. Unfortunately, along with providing such an improvement, the organosilane materials can result in imperfections to the woven cloth or fabric made from the strands. When cloth or fabric of strands with organosilane coupling agents are heat cleaned to remove some or all of the chemical treatments, a deposit or residue can remain on the woven cloth or fabric. Imperfections of this nature can prove to be detrimental in the use of the cloth or fabric.

It is an object of the present invention to provide a chemical composition that provides lubricating properties and that also can allow for formulations coating such substrates like fibers to have improved tensile strength with little, if any, formation of detrimental deposits or residues on the fibers or strands upon removal of the formulation by heat cleaning.

SUMMARY OF THE INVENTION

The foregoing object and other objects gleaned from the following disclosure are accomplished by a chemical reaction product of one or more polyamines having fatty acid moieties and free primary and/or secondary amines hereinafter referred to as "Polyamine I" and of one or more amine-reactable organo functional silane ester and/or hydrolysis products thereof. The reaction product can be formed by any order of addition of the reactants in the proper molar ratio to produce the Silylated Reaction Product Polymer hereinafter referred to as "Silylated RP Polymer". The Silylated RP Polymer can have a cationic lubricating property with a residual amine value in the range of about 200 to 800 and can have a residual acid value in the range of up to around 20 and has organo silane moieties with hydrolyzable or partially or fully hydrolyze groups.

The "Polyamine Z" reactant includes both polyamines with the acid moieties and free amines as well as polyamine-polyamides and/or amidoamine polymers like acylated polyamines and/or condensation products of polyamines and/or of polyalkylamines with polyfunctional acids some of which include fatty acids, polyalkyleneimines. The amine-reactable organo functional silane esters or hydrolysis products thereof, hereinafter referred to as "Amine-reactable silane", generally having the formula:

$$X_a\text{—Si(OR)}_b$$

The X is an organic radical having an amine-reactable moiety. By use of the term "amine-reactable" for the moiety it is meant that the organofunctionalalkoxysilane or hydrolysis products thereof have or are capable of having one or more reactive moieties in the organofunctional portion of the compound that can react with amine moieties of the Polyamine I. such as one that can react with active hydrogens present on the residual amines of the Polyamine I, which can be selected from such moieties as: epoxy or glycidyl groups, isocyanato groups, ester groups, alkyl halo groups, and acryloxy groups. Also the term is meant to include organofunctional alkoxysilanes that are not originally amine reactable but can be made reactable with the Polyamine I through the use of reaction assisting materials. In addition to the amine-reactable moiety the organic radical can have alkyl radicals like saturated alkyl radicals having 1 to 6 carbon atoms, cycloalkyl, aryl, and alkaryl radicals containing 6 to 10 carbon atoms. The term "a" is an integer ranging from 1 to 2 and the term "b" is an integer that is equal to 4−a. The term "R" is a hydrogen; alkyl radical having one to six carbon atoms; cycloalkyl, aryl, and alkaryl radicals containing 6 to 10 carbon atoms; and mixtures of hydrogen and one of these organic radicals when "b" is greater than one.

Another aspect of the present invention is the Silylated RP Polymer present by itself or with at least water in a major amount for use as an aqueous-based chemical treating composition for substrates. The types of substrates can range from glass substrates of any shape including glass plates and fibers to organic substrates like fibers. Another aspect of the present invention is a method of treating fibers with a fiber lubricant which comprises pre-reacting one or more Polyamine I with one or more Amine-reactable silane to yield the Silylated RP Polymer, formulating the pre-reacted material with at least water in a predominant into a chemical treating composition, applying the formulated composition to the fibers, and gathering the fibers into bundles of fibers.

DETAILED DESCRIPTION OF THE INVENTION

The Polyamine I that is useful in preparing the Silylated RP Polymer can be obtained from several different reactants. For example, a polyamine and/or polyalkylenepolyamine and/or polyalkyleneimine can be reacted with or is capable of reacting with fatty acid materials with or without the presence of dimer acids including polymeric fat acids to have at least one fatty acid moiety. In one aspect of the invention dimer acids are used in a sufficient amount and of the type to produce a Polyamine I that has lubricating properties and has sufficient free amine and/or acid for at least water dispersibility. The lubricity of the Polyamine I can be that which establishes a fluid film type of lubrication between the surfaces of two substrates. The substrates can be glass fibers having a diameter in the range of around 4 to 30 microns or more in a bundle of a plurality of fibers. Such bundles or strands need lubrication because of the loadings and forces encountered in processing and handling. A nonexclusive example of a situation were these are encountered is the winding of the strand(s) into a cylindrical, annular package of fiberous bundles without the production of broken fibers or fuzz. The lubricity is provided through use of the Polyamine I by itself or with other components in a formulation.

A suitable example of a Polyamine I is one or more polyalkylpolyamines reacted with fatty acids including partially amidated polyamines, where the polyamine before amidation can have a molecular weight up to around 50,000 or more as in U.S. Pat. No. 3,597,265. A suitable commercially available partially amidated polyalkylenepolyamine is Emery 6717 where the polyamine is polyethyleneimine with a molecular weight of around 1200 and with residual amine values in the range of up to around 400 that is available from Henkel Corporation, Emery Group, 11501 Northlake Drive, Cincinnati, Ohio. Another suitable example is one or more condensation products of polyamines with fatty acids with or without other dimer acids such as the Versamid and Gensmid resins, and these are also available from Henkle Corporation, Polymers Division, 5325 South 9th Avenue, LaGrange, Ill. 60525. One of these in particular is Versamid 140 that has a viscosity at 25° C. of 116 poise, weighs 8.1 pounds per gallon, and has a solids content of 100 percent, a specific gravity of 0.970, no volatiles at 70° F. and a flash point >365° F. A process for the preparation of such polyamides is described, for example, in U.S. Pat. No. No. 2,881,194 to Peerman et al.

Additionally, polyethyleneamines like acylated polyethylamines can be used that are prepared; for example, from linear poly-2-oxazolines with an alkyl substituent at the number 2 position. The alkyl substituent can be of 1 to 17 carbon atoms and the degree of polymerization can be about 8 to 22.

Condensation products of the polyamines and fatty acids with or without other dimer acids can have many isomeric forms one of which can have the following formula:

wherein: R is an aliphatic radical having from around 14 to around 34 carbon atoms, preferably unsaturated cycloaliphatic difunctional radicals containing from around 26 to around 34 carbons atoms; n is an integer ranging from 0 to around 3, preferably 2; and n is in the range of around 1 to 15, preferably around 1 to 2.

The Polyamine I as discussed above and in the above formula can be obtained, for example, by the condensation of a polyamine with a dimerized fatty acid. The polyamine used can be, for example, iron an alkyl amine having iron 2 to around 8 carbon atoms, such as ethylenediamine, diethylenetriamine, tetraethylenepentamine or triethylenetetramine. Another type of polyamine that is useful is the commercially available polyalkylenepolyamines which are mixtures of polyalkylenepolyamine homologs. For example, polyethylenepolyamines can be used and it is also possible to use polyalkylenepolyamines using ethylene and propylene groups. Such mixed polyalkylenepolyamines can be readily prepared by condensing ethylene diamine with one more proportion of acrylonitrile to form N-cyanoethyl ethylenediamine which can be reduced; for example, by catalytic hydrogenation, to form a mixed alkylene polyamine. For preparing such condensation products suitable dimerized fatty acids can be those prepared from unsaturated fatty acids having from 8 to 18 carbon atoms, such as myristoleic acid, palmitoleic acid, oleic acid, linoleic acid or linolenic acid and others described in the Encyclopedia of Chemical Technology, 2nd Edition, Kirk and Othmer, Volume 8, pages 811–856, Interscience Publishers, New York, 1965 for its discussion of the fatty acids including the monoethenoid and polyethenoid compounds and methods of preparation.

Another suitable Polyamine I is a chain-extended polyamine having or capable of having a fatty acid or dimer acid reaction product. Such a material can be prepared from the following types of reactants in the generally below-described reactions.

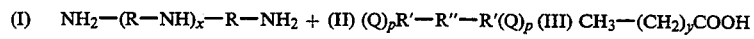

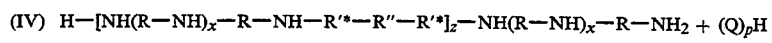

+

-continued (VI) is (IV) and/or (V) with moieties of the repeating unit that involve branching such as one or more of the following:

(VII) 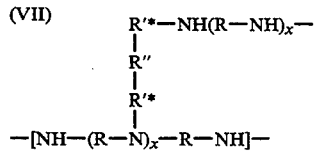

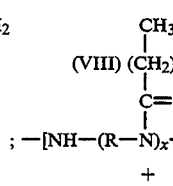(VIII)

(IX) 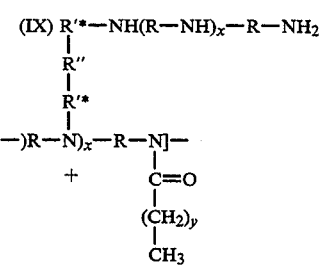

wherein: 1) p, w, x, y and z are integers where p is 1 or 0 and x and y have the values of those for the reactants and w and z have values to provide a molecular weight up to around 50,000 Mw but preferably up to selected from carbonyl, alkyl oxirane and diisocyanate groups, R' is selected from carbonyl, alkyl oxirane and diisocyante groups, R''' is selected from hydrogen, lower alkylene group having from 1 to 4 carbon atoms, and Q is selected from OR, or halide and R'* is a cleaved oxirane group or a urea functionality from reaction of the isocyanate with the amine, wherein Q is OR or halide when R' is a carbonyl group and Q is halide when R' is a lower alkyl and p=O when R' is an oxirane group.

2) Preferably (I) is present in an amount in a slight excess to control the molecular weight. The reaction is conducted so that the production and yield of structure V is favored since it is the preferred lubricating material. Preferably, the formation of structure IV is held to a minimum since it is a non-lubricating structure and so that the reaction product has an unreacted amine value. This provides the availability of unreacted secondary nitrogen groups in the reaction product to improve its water dispersibility; and 3) since all the reactants can be liquids, the reaction can be done neat although if the viscosity is too high for any particular reactant or reaction product heating or organic solvents like alcohols can be used for dilution. Depending on the particular type of chain extender, where the solvent is an organic solvent, such solvent can be other than alcohol.

For example, where:

I is: $NH_2$—$(CH_2$—$CH_2$—$NH)_3$—$CH_2$—$CH_2$—$NH_2$;
II is: $C_2H_5O(O)C$—$CH_2$—$CH_2$—$C(O)OC_2H_5$ and
III is: $CH_3(CH_2)_6$ COOH.

Preferably, the reaction is conducted with the addition of I and II with the subsequent addition of III to produce mostly Structure V variations rather than a mixture of the other structures.

The reaction with the removal of byproducts can result in a mixture of Structure V depicted below along with some cyclized and/or branched derivatives.

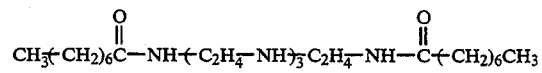

In addition to the above depicted linear structures some of the moieties in the reaction product can be cyclized and or branched. Cyclization can occur since two adjacent amines can react with fatty acids. The reaction product can be a mixtures of all of these structures.

In the above-described formulae and, in general, as nonexclusive examples for the polyamine used in the Polyamine I, the polyamine generally can be any material having three or more amine groups and having the general formula of an $H_2N$—$(C_nH_{2n}NH)_x$—H wherein n can range from around 2 to 6 and preferably is around 2 and/or 3 and x can range from 2 through 28 or more and preferably up to around 6. Also, the polyamine can include a minor amount of diamines such as ethylenediamine and the like. The preparation of these materials is well known in the art- For example, a desired alkylene polyamine results from the reaction of an appropriate alkylene dihalide and ammonia. Examples of suitable polyalkyleneamines include diethylenetriamine (DETA), triethylenetetramine (TETA), tetraethylenepentamine (TEPA), pentaethylenehexamine (PEHA), dipropylenetriamine (DPTA), tripropylenetetramine (TPTA), tetrapropylenepentamine (TPPA), pentapropylenehexamine (PPHA), and dihexmethylenetriamine (DHMTA). These materials are commercially available mostly as a mixture of isomers so that mixtures of the alkylene polyamines, as well as the single polyamines, can be used to prepare the Silylated RP Polymer of the present invention.

The polyfunctional but predominantly difunctional organo compounds useful as chain extenders are compounds where the polyfunctional but chiefly difunctional moieties can react with the nitrogen through the active hydrogens of a residual amine of the polyamine to form a covalent bond. By the term "chain-extender" it is meant, in addition to the aforementioned characteristics, that the reaction of the polyfunctional organo compound increases the molecular weight of the polymeric reaction product through predominantly its difunctionality so that the molecular linkages. The reac- And where Z is equal to 0 the structure can be:

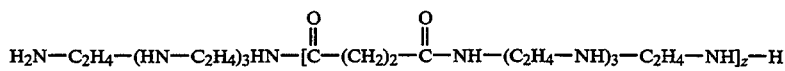

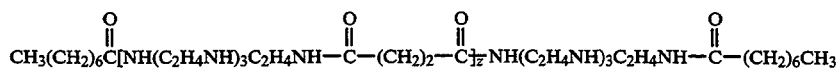

tion between the chain-extender and the polyamine can occur either at the primary amine groups at the ends of the polyamine backbone or with any primary and/or secondary amines along the backbone. It is preferred to choose the reaction conditions and the reactants so that the reaction produces only a minor amount, less than around 50 percent of the reaction product, of highly branched species. These predominantly difunctional organo compounds generally are liquid or solids that melt at temperatures less than around 200° C., and generally can be saturated materials. Some of these compounds also may lead to the formation of imidazolines groups within the RP Polymer. The chain extender is chiefly difunctional in reaction with the polyamine but a minor amount of polyfunctional organo or organic compound can be present that can react difunctionally with the polyamine. Particularly suitable chain extending organo compounds include those having the formula ($X—R_1—Y$) wherein $R_1$ is selected from alkylene, difunctional alkyl and/or aryl radicals having preferably around 2 to around 15 carbon atoms, and where X and Y are each the same or different functional moieties selected from the following moieties: carboxylic acid and/or esters and/or anhydrides, epoxide, also known as glycidyl or, oxirane; halides, like alkyl halides and acid chlorides; isocyanates where the compound can be diepoxide, dihalide, diacid chloride and/or diisocyanate. More specific examples include: glycidyl ethers like bisphenol A diglycidyl ether and butanediol diglycidyl ether, novalac epoxy, dichloroethanes, dichloropropane and the like. Also, the carbon chain length like that of a hydrocarbon chain between the two functional groups should be satisfactory to allow production of at least water dispersible chain-extended polyamine with or without fatty acid moieties and preferably a water-soluble or emulsifiable chain-extended polyamine with or without fatty acid moieties. The length of the carbon atom chain between the difunctional amine reactable moieties is in the range of around 2 to around 10.

Suitable examples of one type of difunctional organo compound for chain extending include: oxalic acid, malonic acid, succinic acid, glutaric acid, adipic acid, and pimelic acid. These materials are from a well known class of acids and their method of preparation is well known to those skilled in the art. Also halogenated derivatives of the dicarboxylic acids or the anhydrides or esters of the acids can be used as the chain extenders. Additionally, these types of chain-extenders can be used as part of a mixture with fatty acids for condensation reaction with polyamines to produce the Polyamine I.

The difunctional organic chain extenders can be used individually or in a mixture of chain extenders. Although saturated carboxylic acids are preferred, a small amount of unsaturated dicarboxylic acids such as maleic acid and the like can be used in admixture with the saturated dicarboxylic acids. It is most preferred to use an ester form like dialkyl succinate, for instance, diethyl succinate.

The conditions for reacting the polyamine, including the polyalkylenepolyamines and the polyalkyleneimine and the reaction product of the polyamine and the fatty acid material (hereinafter discussed), and the difunctional organo chain extender depend to a degree on the particular compounds that are used. Generally, the reaction is that of less than an excess of the chain extender but at conditions to allow for reaction of a substantial portion if not all of the chain extender, For example, when the chain extender is a diester, the temperature can be about 80° C. to about 180° C. while with a diepoxy compound lower temperatures even at or around room temperature can be used while the diacid chain-extenders can have a high temperature around 180° C. to around 220° C. The times for all of these reactions can be varied to accommodate a particular temperature within the expressed ranges, but generally the time is that which is sufficient to produce a satisfactory yield of at least water dispersible chain extended polyamine with or without, depending on the starting reactant, fatty acid material. Preferably, the reaction is conducted neat if the reactants and reaction product have accommodating viscosities. If viscosities of one or more of the reactants or reaction product are too high for suitable reaction conditions, the viscosity can be lowered by heating or the use of one or more solvents. When diepoxies are involved alcohols and alcohol ethers can be used, whereas with the use of diesters the reaction can usually be conducted in the neat state.

The aforementioned types of polyamines or polyamines and difunctional organo compounds including the chain extended polyamine including polyalkylenepolyamine can be reacted through what is believed, without limitation of the scope of the invention, to be a partial amidation through reaction with one or more Fatty Acid Materials. Suitable nonexclusive examples of these Fatty Acid Materials include: fatty acids, fatty acid esters, fatty acid halides or anhydrides of the acid, where a predominant amount of these Fatty Acid Materials are monovalent in reaction with the chain extended polyamine or polyamine to form a condensation product. The Fatty Acid Materials, hereinafter referred to in the specification and claims as Fatty Acid Material, can be essentially saturated and preferably they are aliphatic of either the straight or branched chain variety. The fatty acids having from 1 to around 22 carbon atoms and preferably 7 to 12 carbon atoms are preferred. Suitable nonexclusive examples of Fatty Acids Materials include: acetic acid, pelargonic acid, 2-ethylhexoic, isononanoic, oleic, undecenylenic, caproic, caprylic, octanoic, capric, lauric, and stearic. As previously mentioned the esters, acid halides, and anhydrides of these acids can also be used. When fatty acids with amounts of carbon atoms of 6 or less are used, they should be used in a mixture with fatty acids having the higher number of carbon atoms greater than 6 and in a minor amount of that mixture not exceeding around 50 weight percent of the mixture of fatty acids on a weight percent basis.

Also, the fatty acids and/or esters and/or acid halides and/or anhydrides can be used in several types of mixtures, although the various components of any one mixture can also be used in the other types of mixtures. All of the mixtures have fatty acids and/or acid halides like acid chlorides and/or esters and/or anhydrides in a predominant amount of the mixture. One such mixture would include a minor amount of difunctional and/or trifunctional fatty acids and/or polymeric fat acids and/or fat acids, Polymeric fat acids are polymerized fat acids either dimeric, trimeric, or higher polymeric forms and thus include the polymerized mixture of acids which usually contains a predominant portion of dimer acids, a small quantity of trimer and higher polymeric forms, and some residual monomer. Fat acids are naturally occurring and synthetic monobasic aliphatic acids having hydrocarbon chains of 8 to 24 carbon atoms and include saturated, ethylenically unsaturated, and acetylenically unsaturated acids. Another type would include mixtures of saturated and unsaturated Fatty Acid Materials where the amount of unsaturated Fatty Acid Materials is a minor amount. Also, acid mixtures such as those obtained by hydrolysis of natural fats and oils are useful. These suitable examples are those derived from coconut oil, corn oil, cottonseed oil, tallow, tall oil, and soybean oil. The acids prepared from these oils are various mixtures of approximately 14 to 20 carbon atoms, some of which include both saturated and unsaturated fatty acids including, for example, tetradecanoic, tetradecenoic, hexadecanoic, hexadecenoic, octadecanoic, octadecenioic, octadecadienoic, eicosanoic acids, decanoic, dodecanoic and octadecatrienoic acids. These materials are useful in mixtures with predominantly saturated fatty acids although it is also possible to use straight-chained or branched-chained fatty acids, Although such a wide variety of Fatty Acid Material can be used, Fatty Acid Material difunctional and trifunctional fatty acids and/or unsaturated Fatty Acid Material are used in a minor amount of generally less than 50 weight percent of the mixture.

Generally, the reaction of any of the aforementioned Fatty Acid Material with the polyamines and/or chain extended polyamines can occur at conditions that vary to some degree depending on the particular reactants. For example when the polyamine is polyalkylenepolyamine, the reaction can occur at a temperature ranging from room temperature to elevated temperatures depending on the reactants. For instance, for Fatty Acid Material that are halides, the temperature can be from room temperature up to around 70° C. or so, while for Fatty Acid Material that are fatty acids the temperature can be from around 140 up to around 200° or more, while preferably with the Fatty Acid Material that is the diester like a succinate the temperature is in the range from around 130° C. to around 200° C. in the absence of any solvent. For the case of the Fatty Acid Material that is a fatty acid and the lower reaction temperatures are used, usually one mole of condensation water is removed for each mole of the acid reacted, while at higher reaction temperatures an additional mole of water can be removed. With the ester as the Fatty Acid Material usually one mole of alcohol is removed at the lower temperature and one mole of water can be removed at the higher reaction temperatures.

The molar ratios of amounts of the two or three aforementioned reactants to produce the Polyamine I can be of polyamine to difunctional organo compound and/or Fatty Acid Material in the range from 1 to 4 of polyamine to organo compound and from about 1 to about 10 for polyamine to Fatty Acid Material. Preferably the molar ratios are in the range of around one for the organo chain extender and from around 1.005 to 2 for the polyamine, and from around 0.25 to around 25 for the Fatty Acid Material. Most preferably, the molar ratio of the chain extender to the polyamine is around 1 to 1.25.

Any of the Polyamine I materials are reacted with one or more amine-reactable silane (hereinafter referred to as "Amine-Reactable Silane") to form the Silylated RP Polymer of the present invention. By use of the term Amine-Reactable Silane it is meant that the organofunctional alkoxysilane or hydrolysis products thereof have or are capable of having one or more reactive moieties in the organofunctional portion of the compound that can react with amine moieties of the Polyamine I. The term is meant to include organofunctionalalkoxysilanes that are not originally amine reactable but can be made reactable with the Polyamine I through the use of reaction assisting materials. For instance an aminoorganofunctionalalkoxysilane can react with a dialdehyde or diacid to make the silane amine-reactable. The converse is also true that non-amine-reactable silanes can react with the Polyamine I after the reactable amines of the Polyamine I have reacted with the dialdehyde or diacid. Suitable nonexclusive examples of the Amine-Reactable Silane are listed below for each of the aforementioned types and each compound can also be used in its hydrolyzed or partially hydrolyzed form. These forms include the corresponding silanols and/or polysiloxanes. The latter would be present only to the extent that gelation of the silane material and precipitation from solution can be avoided.

For the epoxyorganofunctional silane esters those that are useful can have the formula: $CH_2CH(O)-CH_2-O-(CH_2)_x-Si(OR)_{1-3}$ where x is an integer from 1 to 6 and R is a lower alkyl, for example, methyl, ethyl, propyl, isopropyl and the like or the formula: $CH_2CH(O)-C-(CH_2)_z-Si(OR)$ 1-3 where z is an integer from 1 to 6. Nonexclusive examples of suitable epoxy silanes include: gamma-glycidoxyalkyltrimethoxy silane; gamma-glycidoxyalkyl trialkoxy silane where the alkoxy group can be methoxy or ethoxy; deltaglycidoxy butyl trimethoxy silane; and 3,a-epoxy cyclohexylethyltrimethoxysilane; beta-glycidoxyethyltriethoxy silane; beta-(3,4-epoxy cyclohexyl)ethyltrimethoxyethoxy silane; beta-(3-epoxy ethyl phenyl) ethyltrimethoxysilane; beta-(epoxy ethyl) ethyltriethoxy silane; 4,5-epoxy-n-hexyltrimethoxy silanes; 15,16-epoxy-n-hexadecyl trimethoxy silane; 3-methylene-7-methyl-6-7 epoxy octyltrimethoxy silane.

For the isocyanatoorganofunctional silane esters, nonexclusive examples of isocyanato silanes include: gamma-isocyanatopropyltriethoxysilane, also known by its GAS name as Silane, 3-(Isocyanato)propyltriethoxy. This silane is an organo functional silane which is commercially available under the trade designation "Silane Y-9030" from Union Carbide Corporation. This material has the chemical formula of $O=C=N(CH_2)_3Si(OC_2H_5)_3$ and is a clear liquid that exists as a greater than 95 percent active material and has a specific gravity at 25° C./25° C. of 0.99 and has an index of refraction of nD 25° C. of 1.419 and has a water white to light amber color and can be diluted with hydrocarbons, ketones, ethers, amides, or esters and is soluble in benzene, toluene, hexane, acetone, diethyl CARBITOL, dimethyl formamide, CELLOSOLVE acetate.

Suitable examples of acryloxy-containing organofunctional silane esters gamma-methacryloxypropyltrimethoxysilane available from Union Carbide and Chemical Company under the trade designation A-174, and other acrylatoalkylalkoxysilanes, such as gamma-acryloxypropyltrimethoxysilane, and the like and the methacrylato-alkylalkoxysilane such as gamma-methacryloxy-propyltrimethoxysilane, gamma-methacryloxypropyltriethoxysilane, gamma-methacryloxypropyltris-(2-ethoxyethoxy)silane and the like.

The molar ratio of the Polyamine I to the Amine-Reactable Silane generally can be in range of around 1 for Polyamine I to around 0.1 to around 25 for the Amine-Reactable Silane, and most preferably 1 to 0.5 to around 1 to 1. An overly excessive amount of the Amine-Reactable Silane that may result in a lesser degree of improvement in use in a textile coating. Preferably, the molar ratio allows for around 1 Amine-Reactable Silane per around every 2500 molecular weight of the Polyamine I. Along with the Silylated RP Polymer there can be a minor amount of unsilylated reaction product from reaction of polyamine and the Fatty Acid Material.

In the preparation of the Silylated RP Polymer, it is preferred to react the Amine-Reactable Silane with a Polyamine I that is a partially amidated or acylated polyamine having a residual amine value from around 200 to around 800 which can also have a residual acid value up to around 20. Generally, the reactants can be combined sequentially or simultaneously at the proper reaction temperature for a prescribed period of time with agitation to produce the Silylated RP Polymer. Preferably, the reaction can be conducted in neat conditions since both reactants are liquids. If a particular Polyamine I has a viscosity that is too high for adequate stirring, the Polyamine I can be heated to reduce viscosity or diluted with a suitable solvent. Such solvents include low alkyl alcohols such as methanol, ethanol, isopropanol, polyethylene glycols, polypropylene glycols and mixtures and copolymers of these glycols, and ethoxylated alcohols like ethoxylated lower alkyl alcohols that are liquids, and water. When a solvent is used, it is preferred to combine the Polyamine I with the solvent for subsequent addition of the Amine-Reactable Silane. In both the neat and solvent preparation routes, it is preferred to add the Amine-Reactable Silane slowly over a period of around 10 to 50 minutes with agitation. As mentioned above in discussing the particular reactants, the temperature of the reaction can vary given a particular type of reactant. The reaction is conducted preferably so that most if not all of the silane that is added is reacted. After the addition of the silane, agitation of the mixture is continued at a temperature similar to that for silane addition. Generally, a time of around 15 minutes to 8 hours can be used. With the use of molar ratios of Amine-Reactable Silane to Polyamine I of greater than around 1 to 1, detrimental properties can result for certain substrates coated with the silylated RP Polymer. For instance, in heat cleaning of cloth, especially cloth from glass fiber strand yarn, the industry needs the removal of most not all of the chemical treatment from the strands without the formation of deposits or residues on the strands or fabric. Too large an amount of the Amine-Reactable Silane compared to the Polyamine I may result in the formation of such deposits. After formation of the Silylated RP Polymer, whether in a neat state or with a solvent, the Silylated RP Polymer can be diluted with water to produce a formulation which has a major amount of water. If the aqueous solution of the Silylated RP Polymer has too high of a pH of around 11 or more, acid, preferably organic acids like acetic, can be added to lower the pH.

In addition to the Silylated RP Polymer and water, other components can be added to form suitable coating formulations. Any other components known to those skilled in the art for coating substrates can be used. For instance, the Silylated RP Polymer with a lubricating property can be used alone or in a coating formulation with other components to treat substrates like polymers in organic fibers and those having oxide surfaces such as glass. One suitable substrate is glass fibers produced from molten streams of glass from any glass composition and formed into fibers of any diameter known to those skilled in the art. For instance, suitable compositions include the "621-glass" and "E-glass", S-glass, D-glass and similar glass compositions with r or free boron and/or fluorine derivatives. Preferably, for treating these substrates, the formulation is an aqueous formulation of the Silylated RP Polymer with possibly the addition of one or more film-forming polymeric materials, and/or additional lubricants and/or processing aids and mixtures thereof. The Silylated RP Polymer is particularly suited for use with other components to provide a starch-lubricant type size for glass fiber textile strand and/or yarn. These materials can include starches, lubricants like oils and waxes, emulsifiers and/or surfactants for the oil and/or wax, and water for a textile starch-lubricant aqueous-based size and binder as a coating for the fibers. The lubricating properties of the Silylated RP Polymer also can be useful in treating organic fibers like polyesters, polyamides and the like. In formulations for treating glass fibers, the nonaqueous components would include the Silylated RP Polymer lubricant and the range of solids for the components would generally be from about 1 up to around 30 weight percent of the aqueous formulation along with the predominant amount of water.

Today, industry demands textile strands of glass fibers that result a reduction in broken filaments during use in weaving, acceptable strand insertion times in high speed looms, especially modern air jet looms, and good heat cleaning capability. Modern air jet looms operate at much faster speeds than the old conventional shuttle looms. In addition, conventional heat cleaning practices to produce the finished cloth product can result in a substantial loss in strength properties from that of the nonheat treated cloth. With the use of the Silylated RP Polymer providing both cationic lubricating properties and the silane coupling agent mechanism, standard starch-oil sizes for glass fiber textiles can be transformed into better performing products having improved heat cleaning properties- The improvement is that the heat cleaned cloth can retain more of its pre-heat-treated strength while maintaining good weavability and heat-cleanability. When the Silylated RP Polymer that is preferably a silylated amidated polyamine is used with a preferred starch-oil size, the glass fiber textiles have good strength properties, low broken filament counts in weaving, and good heat cleaning properties. The preferred starch-oil size is an aqueous-based, starch-oil size having adjusted quantities of at least one starch and of a particular type of oil and having a non-starch second film forming polymer along with the preferred silylated polyamine. Alternatively, a water soluble starch can be used with the oil without the presence of a non-starch second film forming polymer.

In the following description of the textile strand of the present invention, reference to "weight percent" for components of the binder refers to weight percent of the non-aqueous components of the binder. This includes the solids content of emulsions and dispersions even those that are aqueous-based and non-aqueous liquid materials and solid materials. When the terms "weight percent" are used in a different context this will be noted.

Generally, suitable examples of starch-lubricant sizes including starch-oil sizes are any of those known to those skilled in the art: for instance, the sizes for glass fibers which have been consolidated into textile strand form that are given in the book "The Manufacturing Technology of Continuous Glass Fibers" by K. L. Lowenstein, Elsevier Publishing Company, New York, 1973, at pages 192-193. The author describes, in general, the typical starch-oil sizes utilized in the fiber glass industry today in preparing textile glass fiber strands.

Other suitable starch-oil sizes include those described in U.S. Pat. Nos. 3,227,192; 3,265,516 and 4,002,445.

Typically, the types of starches that can be used include those having a low amylose content, which means that the starch composition can contain up to about 40 weight percent amylose in the starch, preferably between around 10 to around 30 percent. The preferred starches utilize a mixture of modified potato and cross-linked corn starches both with a low amylose content. Starches conforming to these criteria are available as Amaizo 213 starch manufactured by the American Maize Products Company and as National 1554 manufactured by National Starch Company. Another example of a suitable starch is a low amylose starch that is water soluble after cooking such as a potato starch ether that is nonionic like that available from Avebe b.a. 9607 PT Foxhol, The Netherlands under the trade designation "Kollotex 1250". The amount of starch provides, or assists in providing, when a second film former is used, an effective amount of a film former for the textile strands of the present invention. By "an effective amount" is meant an amount of film former sufficient to adequately bind the individual glass fiber filaments together and maintain the integrity of the strand bundle during processing.

Any of the lubricants can be used that are known to those skilled in the art in the customary or traditional amounts including: cottonseed oil, corn oil, soybean oil, glyceroltrioleate and the like. Other lubricants that can be used include fatty acid ester of a non-polymeric polyhydric alcohol, such as triol oils. Nonexclusive examples include the Kessco oils that are a trimethylolpropane triester, or a pentaerythritol tetraester, where the alkyl group of the ester can have from around 7 to around 10 carbon atoms. These materials may be either a liquid or a solid at ambient temperatures, i.e., around 18 to 23 degrees Celsius, but preferably a nonionic oil like a hydrogenated oil, for instance, vegetable oil is used. The amount of the nonionic lubricant that is present can be any amount known to those skilled in the art. The amount can range from greater than zero to amounts greater than 25, preferably greater than 27, weight percent. Most preferably, the amount is not greater than the amount which reduces the hardness of the strand resulting in sloughing of the strand from a strand package. Also amounts in excess of this stated amount may deleteriously impact upon the twistability of the sized fibers into textile yarn. The ratio of the amounts of oil to the amounts of starch most preferably can be greater than 5/12 or 0.4 and generally up to a ratio of around 1.5. A suitable hydrogenated vegetable oil, and the preferred one, is that available as Eclipse 102 hydrogenated soybean oil.

In preparing the dispersions and/or emulsions of the lubricants with limited water solubility, for the starch-lubricant size, any one or a combination of the typical emulsifiers and/or surfactants in their customary amounts can be utilized. Non-exclusive examples include those disclosed in U.S. Pat. Nos. 3,227,192; 4,681,805; and 4,197,549. Typical emulsifiers are materials such as Igepal CA-630 which is an oetylphenoxy poly-(ethyleneoxy) ethanol wetting agent. Another typical and suitable material is Triton X-100 which is an octylphenoxypolyethoxy ethanol manufactured by the Rohm and Haas Company. In the preferred embodiment of the invention, a single emulsifier like Tween 81 can be used or a mixture of both Igepal CA-630 and Triton X-100 are employed in equal amounts by weight.

As long as the emulsifier or wetting agents used have suitable hydrophilic, lipophilic balance in the emulsion, recourse to any of the conventional wetting agents may be had in accordance with the practice of the invention. Generally, each emulsifier, when a combination of them is employed, is present from about 1 to about 5 and preferably from 1.8 to 4.5 percent by weight of the solids. In any event the total quantity of emulsifiers used is typically between 3 to 9 percent by weight of the solids.

Suitable oil-in-water dispersions or emulsions are prepared utilizing the one or more of the oil lubricants and one or more of the emulsifiers generally described above. To maintain the stability of the dispersion or emulsion in the preferred starchy oil size, care is taken to insure that, on a solids basis, the weight percent of all of the starch components are preferably lower than 50 percent, most preferably around 45 percent and below but greater than 35 weight percent. Similarly, the oil lubricant which is utilized, is provided in amounts ranging from greater than 25 to around 40 percent, and most preferably 27 to 38 percent so that preferably the ratio of the amounts of oil to starch is less than 1.

The presence of a non-starch second film forming polymer can assist the starch in providing an effective amount of film former by its capability to tack bond the filaments or fibers together at various contact points along the fibers. This second film forming polymer can be and preferably is present in the preferred starch-oil size in an amount in the range of about 0 to about 20 weight percent of the non-aqueous components of the binder. Such materials are the poly(vinylpyrrolidone) ("PVP") homopolymers and copolymers of PVP, poly(vinylacetate), and poly(vinylalcohol), epoxy resins, polyesters and the like. An alternative to the PVP is low molecular weight polyvinyl acetates since they provide a softer film on the surface of the glass fiber bundles. Generally, the second film former is present in effective amounts along with the starch to provide an effective cover for the strands and provide integrity to the bundle, i.e., the bundle maintains its compactness after the filaments have been gathered in strand form and maintains that integrity when the strands are dried and subsequently processed. The preferred amount is in the range of around 3 to 15 weight percent so that the one or more starches always constitute the predominant film forming material in the binder. When this material is PVP and when its amount is greater than around 5 weight percent, the amount of oil lubricant is less than &0 weight percent and preferably less than 35 weight percent. In other words when the amount of PVP is increased to greater than 5 weight percent, there is a concomittant decrease in the amount of oil lubricant to less than 40 or less than 35 weight percent. Preferably this reduction is on a one to one basis. The most preferred effective amount of film former for this purpose utilizing, for example, PVP would be in the area of 3 to 8 percent.

Any of the aforedescribed Silylated RP Polymers can be used in the starch-oil sizes but preferably the silylated amidated polyamine available from PPG under the trade designation Alubraspin 227 is used. The amount generally is in the range from around 0.5 to around 15 and preferably around 1 to around 4 weight percent of the solids of the size. Preferably with the Silylated RP Polymer having both the desired degree of silylation and desired amount of the fatty acid moieties for lubricating properties, the presence of the Silylated RP Polymer reduces or obviates the need to use any organosilane coupling agents and/or cationic lubricants. This is a result of the more efficient use of the silane coupling agent through the Silylated RP Polymer than just the use of the individual organosilane coupling agent. The preferred starch-oil size is essentially free of any additional monomeric silane coupling agent. However, the organosilane coupling agents and cationic lubricant materials can be used along with the Silylated RP Polymer in the same or lesser amounts, because of the presence of the Silylated RP Polymer, the amounts of the coupling agent and cationic lubricant can be reduced from those used in known starch-oil sizes. Also the coupling agent and/or cationic lubricant can be present when the Silylated RP Polymer has a lesser amount of silylation or a lower degree of lubricating function. In the preferred starch-oil size, the Silylated RP Polymer is present in the form where the solution or mixture is pH adjusted and the silyl moieties are partially and/or fully hydrolyzed. Any suitable acid known to those skilled in the art for hydrolyzing silane coupling agents can be used. Preferably, acetic acid is used in an amount for at least partial hydrolyzation of the hydrolyzable moieties of the silyl groups of the silylated polyamine.

If it is desired to use additional amounts of organo silane coupling agents or cationic lubricants, any of the ones known to those skilled in the art can be used. Nonexclusive examples include: for coupling agents: mono-, di-, and poly-aminosilanes like gamma-aminopropyltriethoxysilane; vinyl silane; and glycidol propyltrimethoxysilanes and the like and for cationic lubricants: the alkyl amine imidazollne reaction products of a polyalkylene pentamine and stearic acid and the amidated polyamine lubricants. A nonexclusive example of the former is the material sold under the trade name Cation X manufactured by Rhone-Poulenc, Inc., Lyndall/North Division, Dalton, Ga. 30720, although it is preferred to limit the use of this cationic material. A suitable example of the latter is the partially amidated polyalkylenes imines such as the reaction product of mixtures of $C_{12}$ to about $C_{18}$ fatty acids with a polyethylene amine having a molecular weight of about 1200 such as those disclosed in U.S. Pat. No. 3,597,265. Commercial examples of these include those manufactured by Emery Industries of Cincinnati, Ohio, under she trade designations Emery 6717 and Emery 6760, which is a 65 percent version of the 6717 material. The lubricants can be used in amounts based on weight percent of the non-aqueous components of the binder of greater than 1 and up to around 6 and preferably from 1.5 to 4.

As an optional component in the preferred starch-oil size or in any of the starch-oil sizes any natural and/or synthetic wax known to those skilled in the art may be used. A suitable amount can range up to 25 weight percent. Suitable examples of the waxes are those described in U.S. Pat. No. 4,795,678 (Girgis). When the amount is greater than zero, there can be a percent for any increasing amount of wax. Preferably, wax is not present in the binder so that the oil lubricant is the sole nonionic lubricant present in the binder. The amounts of the starch and soil that are present in the binder on the basis of weight percent of the non-aqueous components of the aqueous-based binder are at least 35 and at least 25, respectively. With these amounts of starch and oil, the ratio of the amounts of oil to starch can be at least greater than 0.4 and can be as great as 1.5. The particular type of oil is a hydrogenated vegetable oil and/or mineral oil and/or fatty acid ester of a non-polymeric polyhydric alcohol.

Typically biocides also are employed in starch-oil sizes of the instant invention to prevent mold, mildew, and/or fungus attack on amylose-containing starch derivatives. Therefore, there can be present a biocide effective amount as known to those skilled in the art of the following nonexclusive examples: metallo organic type material such as tributyltin oxide, methylene-bisthiocyanate manufactured by ChemTreat, Inc. under the trade name Chemtreat C1-2141, Biomet 66 is a typical metallo containing compound that can be used and is a bis(tri-n-butyltin) oxide and n-alkyldimethylbenzyl ammonium chloride manufactured by M&T Chemical Co., Inc.

Water is usually the carrier for the solids and/or nonaqueous components in the size. The amount of water present in the size is that amount to facilitate the application of the aqueous size to the glass fibers preferably during their formation. To this end the amount of water provides a viscosity for the binder that is sufficient for application of the binder to the fibers during their formation and production into strands. Generally, this viscosity coincides with a total solids (non-aqueous) content of the aqueous size in the range of around 0.5 to around 30 weight percent, and preferably around 3 to 10 weight percent. The total solids should be adjusted whereby the level of the size is acceptable for application to the glass fibers. For example, in a size which is predominantly water, the viscosity is between around 3 to around 60 centipoise at 20° C. Thickening agents can be used to increase the viscosity of the size, but generally if the viscosity is higher than 100 centipoise at 20° C., the size is difficult to apply to the glass fibers during their formation. The strands with the size have the moisture content of the size reduced by drying to form the glass fiber textile strands of the instant invention having the dried residue of the size in an amount of around 0.3 to around 3 weight percent of the strand. These strands can provide up to around a 90 percent reduction in broken filaments over some currently available commercial glass textile strands. Such an improvement is obtained while also maintaining and in some cases even improving the twistability, weaveability, heat-cleanability, and slashings compatibility for the textile strands. An improvement is observed in heat-cleanability over glass fiber textiles having a starch-oil sizing composition with a separate monomeric silane coupling agent, Generally, the preparation of the size can occur by the simultaneous or sequential addition of the components to form the size. One suitable sequence of addition is the starch or starch blend, the oil lubricant or blend of oil lubricants in emulsion form, the non-starch film forming polymer, the cationic lubricant, the organoalkoxysilane, and the fungicide and the balance of water not already added with the individual components to achieve the desired volume and solids level for the binder. The preferred sequence of addition is to combine the at least one starch and the water soluble components and add the oil soluble components.

The aqueous binder is applied to the glass fibers preferably during their formation by any method known to those skilled in the art. The application of the binder to the fiber results in strands of fibers that can have about 0.5 to about 3 weight percent of the size, preferably around 0.8 to 1.4 weight percent on a loss on ignition (LOI) basis. The LOI test is a well-known technique for determining the amount of size on glass fibers. The filament or fiber diameters generally range from around less than 3 to around 30 microns such as beta fibers to fibers with larger diameters that still allow for twisting of bundles of fibers. The glass fibers themselves can be formed by any method known to those skilled in the art by direct or indirect melt processes and forming the fibers through orifices in a bushing. Preferably, water sprays and conditioned air are used to cool the fibers, and the fibers are treated thereafter with the aqueous size preferably, shortly after their attenuation from the bushing and their cooling. The fibers are drawn from the bushing by a winder, and after the size is applied, the fibers can be gathered into one or more strands and wound into an annular package on the winder.

The glass fiber strands with size in the multilayered packages are dried to reduce the moisture content of the package to generally in the range of about 1 to 15 weight percent of the package. Accomplishing the moisture reduction usually involves drying the packages in an oven at conventional temperatures and times or by air drying for conventional time periods. Another approach to drying involves placing the paper tube with the strand deposited thereon in a humidity and temperature-controlled environment and conditioning them for 8 hours. The strand are twisted and wound onto bobbins. The conditioning and air drying during twisting provides a dried residue of the binder on the surface of the filaments forming the unitary strand.

The twistable strand of glass fibers with binder of the present invention can be twisted by any glass fiber twisting techniques known to those skilled in the art. For instance, any twist frames for twisting glass fibers that are known to those skilled in the art are useful in twisting the glass fibers of the present invention. For example, twisting can be conducted as described in the book entitled "The Manufacturing Technology of Continuous Glass Fibers" by K. L. Lowenstein, Elsevier Publishing Company, New York, 1973, and the second edition 198. Generally, the level of twist can be in the range of around 0.5 to around 3 turns/inch. Twisting places a demand on the twistable strand in that the strand must be flexible enough to undergo the rigors of twisting and allow for the individual filaments being free to move in the bundle or strand. The twisted strand or yarn present on the bobbin is useful in producing woven and non-woven fabrics, knitted and/or braided products and reinforcement for various tape products and composite products. Woven fabric can be produced with any conventional shuttle loom, air jet loom, rapier loom, or shuttleless weaving machine known to those skilled in the art.

For a more complete understanding of the invention, reference is made to the following examples which illustrate the manner of preparing the Silylated RP Polymer that is a lubricant and can be used alone or with other components for coating substrates and the manner of preparing the coating formulations used to prepare treated strands in accordance with this invention.

EXAMPLE 1

A 3-liter reaction flask, equipped with a nitrogen inlet and outlet, thermometer, Thermowatch TM temperature regulator, heating mantle, water condenser, Barrett TM water trap and paddle stirrer of Teflon ® material was charged with 804.4 grams of polyethyleneimine that had an approximate molecular weight of 1200. An amount of 343.3 grams of a carboxylic acid mixture containing heptanoic acid 33%), nonanoic acid (27%), hexanoic acid (26%), octanoic acid (9%) and pentanoic acid (5%) was added along with 235.8 grams of acetic acid. The reaction flask was flushed with nitrogen for a short period of time, approximately 5 to 10 minutes, then the nitrogen was shut off and the mixture was stirred. Eventually the two phases mixed, darkened slightly and self-heated to 100° C. When the exotherm expired, external heating was started. When the temperature reached approximately 158° C. the water product formed in the reaction and began distilling over into the trap. The reaction mixture was gradually heated over a period of approximately one hour to about 200° C., and water was periodically removed as the trap filled up. The final amount of water formed was 123.9 grams whereas the theoretical amount expected was 117.9 grams. There was a small amount of organic phase also present which separated later. After six hours at 200° C., the nitrogen purge was started and the reaction mixture was cooled. The resulting product that was recovered weighed 1235.5 grams which corresponded to a yield of 97.6%. This material was a polyethyleneimine polyamide and had an average acid value of 4.65 mg KOH/gram and an average amine value of 395 mg KOH/gram as a Polyamine I product.

Several variations of this Polyamine I were produced in a similar method, and had the characteristics presented in Table 1.

TABLE 1

| Example | 1a | 1b | 1c | 1d |
|---|---|---|---|---|
| Acid Number (mgKOH/gm) | 3.0 | 4.6 | 11.2 | 5.5 |
| Amine Value (mgKOH/gm) | 408 | 395 | 349–376 | 405 |
| pH (2%) | — | 10.3 | 11.3 | 11.1 |

The X:Y:Z ratio is a ratio of mers in the polymer; X is the number of nonacylated species ($C_2H_4NH$), and Y is an acylated species ($C_2H_4NCOCH_3$), and Z is a higher acylated species ($C_2H_4NCOR$), where R can be linear with an average chain length of around 6 to 7. The range for the X:Y:Z ratio was around 0.53–0.54 to 0.18–0.27 to 0.19–0.32.

In a one liter reaction flask, equipped with nitrogen inlet and outlet, thermometer, Thermowatch TM temperature regulator, heating mantle, TEFLON ® material paddle stirrer and dropping funnel was charged with 459.2 grams of the Polyamine I product of Example 1. This material has a residual amine value in the range of up to around 400 Also charged to the reaction flask was 272.9 grams of polyethylene glycol 300 that was dried with a molecular sieve until the water content was an average of 271 mg/kg. The dropping funnel was charged with 48.6 grams of gamma glycidoxypropyltrimethoxysilane and eventually delivered 47.8 grams. The mixture of the Polyamine I and the Amine-Reactable Silane was stirred under nitrogen and heated at 70° C. and the nitrogen was turned off when the addition of the silane began dropwise for over 47 minutes with stirring. After addition, the mixture was stirred at 70° C. for another 2½ hours. The reaction mixture was filtered while warm through a dried pressure filter fitted with a glass fiber filter into a dried bottle. The amount of finished product was 736.9 grams for a yield of 94.5 percent. This final product was viscous and was diluted with 61.4 grams of polyethylene glycol 300. Additional dilution was made with the addition of 159.7 grams of polyethylene glycol 300 and the mixture was heated to 60° C. and mixed. This final product had an average of 98.5 percent solids and an amine value of 184, a pH of 10.7 for a four percent solution in distilled water and a density of 1.08.

| Procedure for Preparing Silane Modified TEPA Type Polyamine I | | |
|---|---|---|
| Materials | Weights | Moles |
| Tetraethylenepentamine (TEPA) - Union Carbide | 490 g | 2.59 |
| Diethyl Succinate - Eastman Kodak | 361 g | 2.07 |
| Octanoic Acid - Eastman Kodak | 149 g | 1.03 |
| Methanol - Fisher | 795 g | — |
| Epoxy functional Silane (A-187) - Union Carbide | 123 g | 0.52 |

TEPA was placed in a 2 liter reaction kettle equipped with heating mantle, air stirrer, distillate collector, thermometer, and nitrogen inlet. Diethyl succinate was added to the reactor and a nitrogen purge was started. The mixture was heated with stirring. Condensate of primarily ethanol began to form when the reaction temperature reached 140° C. The temperature was increased to 160° C. as ethanol formation neared completion. Heating was continued until condensate was no longer generated (approximately 1 hour). During this time, a total of 186.5 grams of distillate was collected. The temperature was reduced to 120° C. then the octanoic acid was added. The temperature was increased to 200° C. and held there for 1.5 hours during which 18.2 grams of distillate was collected. The temperature was reduced to 55° C. and 795 grams of methanol solvent was added. The nitrogen purge was discontinued at this time. The mixture was cooled to room temperature and A-187 added with stirring. The mixture was then stirred at room temperature for 1 hour.

Additional examples of the Silylated RP Polymer were made by a similar procedure as in Examples 1 and 2 and the details are presented in Table 2.

temperature of 50° C. and held for eight hours. The reaction product was made into a solution by adding 11.7 grams of the reaction product to 298 grams of distilled water with stirring.

For example 5 as well as example 7 the reaction was conducted in the neat state by the combination of the Emery 6717 with the designated silane since all are liquids. The temperature of the mixture was increased to around 60° C. to reduce the viscosity of the mixture.

For Example 6, the Emery 6717 was placed in a beaker and dissolved in the isopropyl alcohol with stirring and mixture was warmed. The solution was subsequently cooled to room temperature and the silane was added slowly with stirring at a maximum temperature of 34° C. was reached. Again, the reaction product was diluted to 50 percent active material with ethanol to increase the shelf life and/or ease of handling.

For Example 8, the infrared spectra of the reaction mixture showed evidence for the acryloxyalkylsilane modification of the Emery 6717 in aqueous solution. The reaction is reversible but the equilibrium can be shifted to favor the silylated product at high concentrations of the Acryloxyalkylsilane A174 silane or acidic conditions. The effect of acidity was seen in IR spectra of the aqueous mixture of A174 and Emery 6717 at pH 3, 5 and 9. The absorbence at approximately 1700 reciprocal centimeters is attributed to the carbon double bond oxygen stretch of the A174. At a pH of 9, the absorbence was at a maximum indicating a little or no reaction between the A174 and the Emery 6717 material. As the pH is lowered to 5 and to 3 with hydrochloric acid, the silylation reaction is favored and the carbon double bond oxygen bond peak decreases in intensity and is shifted to slightly lower frequency.

In example 9 the solvent was water which contained 36 grams of acetic acid. The method for the aqueous phase modification includes preparing a first solution by weighing 500 grams of 60° C. deionized water at a pH of 6.5 into a 1000 milliliter plastic beaker. With stirring the Emery 6717 at 20° C. is added and stirring is continued until a consistent solution is achieved. A second solution

TABLE 2

| Example | Polyamine I Polyamine I | Amine-Reactable Silane (ARS) | Amounts (grams) (I)/(ARS) | Approx[2] Molar Ratio | Temperature °C. | Time (Hour) | Solvent (Amount) |
|---|---|---|---|---|---|---|---|
| 3 | Versamid 140 | A-187 silane | 22.75 / 2.36 | — | 50 | 8 | Methanol (25 gms) |
| 4 | Emery 6717 | A-187 Silane | 22.8 / 2.4 | 1:1 | 50 | 8 | Methanol (25 gms) |
| 5 | Emery 6717 | Z-6040 silane | 22.8 / 2.4 | 1:1 | 70 | 2 | Neat |
| 6 | Emery 6717 | Y-9030 | 300 / 32.7 | 1:1 | 34 | 2 | Isopropyl Alcohol (100 gms) |
| 7 | Emery 6717 | A-186[1] | 300 / 31.1 | 1:1 | 65–75 | 2 | Neat |
| 8 | Emery 6717 | A-174 | 300 / 31 | 1:1 | 65–75 | 2 | Ethyl Alcohol (330 gms) |
| 9 | Emery 6717 | A-187 | 198 / 118 | 5:1 | 60 | 1 after dropwise addition | Water (700 gms) |

[1]Added dropwise over 5 minutes.
[2]Approximately

For Example 3, the Versamid was placed in a reactor equipped with a nitrogen inlet and an addition funnel and mechanical stirrer and condenser and the reactor was heated to 50° C. The solvent methanol was added with stirring and subsequently the silane was added slowly from the addition funnel with stirring at the was prepared by weighing the deionized water at 20° C., pH of 6.5 in a 500 milliliter plastic beaker and adding the acetic acid. With stirring the silane is added and stirring is continued until the solution is clear. A first and second solutions are added with stirring at an addition rate of approximately 5 milliliters per minute. Once all the solutions are added, stirring is continued for an additional hour at a temperature of about 60° C.

Table 3 presents the Silylated RP Polymer combined with additional components to produce three formulations that can be useful as starch-oil sizing compositions. These sizes were prepared in essentially the same below-described manner for similar components comprising the size.

Sixty gallons of a starch-oil size dispersion was made up in the following manner.

A) To a slurry tank, water is added in an amount of around 35 to around 40 percent of the total volume of the size. To this, the indicated amounts of National 1554 starch and of Amaizo 213 starch are added. The ingredients are cooked in a jet cooker preferably at 255° F. plus or minus 5° at a circulation rate of 1.95 gallons per minute for about 1 minute. The cooked starch is pumped to the main mixing tank.

B) In another mixing tank, cool water in an amount of around 3 to 4 percent of the total volume of the size is placed and to this there is added the indicated amount of glacial acetic acid with slow stirring. To this is added the indicated amount of the Silylated RP Polymer from Example 1, and the mixture is slowly agitated until the solution turns clear. This mixture is transferred to the main mixing tank.

C) In a separate mixing tank, hot water is added in an amount of around 3 to 6 percent of the total volume of the size. To this is added the indicated amount of PVP K-30, a polyvinyl pyrrolidone film former (manufactured by GAF Chemical Corp.). The PVP K-30 is dispersed in the water with vigorous stirring until the PVP K-30 dissolves and the solution turns clear. This resulting liquid is transferred to the main mixing tank.

the main mixing tank through suitable tubing to a glass fiber forming level where a fiber glass forming bushing was located. A bushing can be utilized that is a 800 tip 2G-75 bushing having located below it a belt applicator in which there is sump. The rubber belt attached to rollers which causes the belt to pass through a sump in the applicator to pick up the size that is used at the applicator's surface. The glass fibers or filaments drawn from the 800 tip bushing can be passed over and in contact with the surface of the rubber belt applicator and the size on the surface of the belt is applied to the filaments as they were drawn over it. The filaments can be gathered into strand form at a gathering shoe and wound on a tubular sleeve placed over the surface of the high speed winder. The tubular sleeve with the strand deposited thereon subsequently can be placed in a humidity and temperature controlled environment and conditioned for 8 hours. A dried residue of the size is left on the surface of the fibers. The amount of dried residue on the glass fiber strands ranges from around 0.S to around 1.3 percent by weight of the strand. The resulting strand can be twisted and wound onto bobbins using conventional twisting equipment. The strand so prepared can be evaluated for broken filaments using a broken filament detector of the type described in U.S. Pat. No. 4,610,707 and the broken filaments per 1,000 yards can be measured. The results of the run are shown in Table 4 under the column 1.

Table 3 shows the formulations for four Illustrative Examples ("Ill. Ex.") that do not utilize the Silylated RP Polymer but have a separate or distinct silane coupling agent and cationic lubricant. Also Table 3 shows the formulations, in weight percent of the solids of the components, for several formulations using the Silylated RP Polymer.

TABLE 3

| Example No. | Ill Ex. 1 | Ill Ex. 2 | Ill Ex. 3 | Ill Ex. 4 | 10 | 11 | 12 |
|---|---|---|---|---|---|---|---|
| Starch: | | | | | | | |
| National 1554 | 22.5 | 22.5 | 22.5 | 22.5 | 22.7 | 22.7 | 25.2 |
| Amaizo 213 | 22.5 | 22.5 | 22.5 | 22.5 | 22.7 | 22.7 | 25.2 |
| oil: | | | | | | | |
| Kessco 887 | 35.8 | — | — | — | — | 38.1 | |
| Eclipse 102 | | 38.1 | 35.8 | 38.1 | 38.1 | | 38.3 |
| emulsifier: | | | | | | | |
| Tween 81 | | 7.7 | — | — | 7.7 | 7.7 | 7.7 |
| Triton X-100 | 3.6 | — | 3.6 | 3.6 | | | |
| Igepal CA-630 | 3.6 | — | 3.6 | 3.6 | | | |
| Polymeric film former: PVP K-30 | 5 | 5 | 5 | 5 | 5.3 | 5.3 | |
| Silylated/lubricant | — | — | — | — | 3.2 | 3.2 | 3.2 |
| cationic lubricant (Emery 6717) | 2 | 2 | 2 | 2 | — | — | — |
| Silylated TEPA | | | | | | | |
| organo silane coupling agent Z-6040 | 5 | 5 | 5 | 0.2 | | | |

D) To an Eppenbach mixing tank the indicated amount of the particular type of oil is added along with the one or more indicated emulsifiers in the stated amounts. The Eppenbach mixer is started and the contents heated to preferably around 100° F. to 140° F. All ingredients are mixed thoroughly and hot water at 140° F. to 160° F. in an amount of around 5 percent of the total volume is added slowly, at first, until the mixture turns white and inverts. The resulting mixture is then transferred to the main mix tank.

E) All the ingredients in the main mixing tank are diluted with water to a final volume of 60 gallons at a temperature of approximately 145° F./5°.

Using conventional glass fiber forming equipment, the sizes prepared as stated above were pumped from Several of the sizing formulations of Table 3 were used to make starch sized yarn of the examples of Table 4. The starches used in Table 3 and Table 4 are commercially available. The Amaizo starch is available as Amaizo-213 corn starch from American Maize-Products Company, Hammond, Ind.; the National starch is available as National 1554 potato starch from National Starch and Chemical Co.; and the Cato starch is available as Cato-75 cationic starch from National Starch and Chemical Co.

TABLE 4

Effect of Silylated RP Polymer (SRPP) on Glass Fiber Yarn Tensile Strength, Broken Filaments/1000 yards, Ash Residue

| Example | | LOI | Tensile Strength (lbs) | Broken Filament/ 1000 yards | Ash Content Weight % |
|---|---|---|---|---|---|
| Illustrative Example 2 (Avg. of 4) | | 1.15 | 12.3 | 2.2 | 2.36 |
| (13) | Ex. 10 + additional 0.1 wt % SRPP | 1.28 | 11.8 | 2.4 | — |
| (14) | Ex. 10 + Cato starch and 0.1 wt % SRPP | 1.21 | 11.1 | 2.3 | — |
| (15) | Ex. 10 where SRPP is at 2.2 wt % | — | 10.9 | — | 0.57 |
| (16) | Ex. 14 with just one starch Cato | 1.05 | 11.4 | 3.7 | — |
| (17) | Ex. 16 where one starch is National | 1.2 | 11.1 | 1.8 | — |
| (18) | Ex. 13 | — | 11.2 | 4.3 | — |
| (19) | Ex. 13 | 1.2 | 11.6 | 3.4 | — |
| (20) | Ex. 13 where oil is Kessco | 1.26 | 11.65 | 2.6 | — |
| (21) | Commercial G-75 without silane (PPG Industries, Inc.) | — | 8.5 | 25–30 | 0.33 |
| (22) | Illustrative Example 4 | — | 6.5 | 5.6 | — |

Table 4 presents data on the effect of the silylated RP polymer on glass fiber yarn where the yarn has a G-75 construction with the fiber sizings illustrated. The tensile strength was tested according to the Standard ASTM Method, the broken filament per 1000 yards was tested according to the broken filament detector referred to above. The ash content in weight percent was obtained for the size used to prepare several of the particular sized yarn as indicated in Table 4. This was performed by drying the size formulation and subjecting the dried residue to thermogravimetric analysis in a Perkin Elmer TGA device. The sample was decomposed by heat in air where the temperature was started at room temperature and increased at 20° C./minute till a temperature of 650° C. was obtained. Table 4 shows that the size glass fiber yarn having the Silylated RP Polymer has good tensile strength relative to a commercial sample without a silane coupling agent and fairly close to that of Illustrative Example 3 having a much higher concentration of silane as a monomeric silane coupling agent added to the sizing composition. Also, the broken filaments for the formulations 13-20 using the Silylated RP Polymer averaged 2.92. The ash content of the Illustrative Example 2 having the higher amount of silane was 2.36 as opposed to the commercial sample having an ash content of 0.33 and the yarn having the Silylated RP Polymer having an ash content of 0.57 weight percent. Therefore, Table 4 shows that the yarn having the Silylated RP Polymer of the present invention allows for good tensile strength and reduced broken filaments while allowing for low quantities of ash remaining on the yarn after heat cleaning.

While the invention has been described with reference to certain specific examples and illustrated with embodiments, it is not intended to be limited thereby except insofar as appears in the accompanying claims.

We claim:

1. Silylated polyamine polymer prepared by reacting:
   I) one or more polyamine-containing polymers having one or more free amine groups and one or more moieties selected from the group consisting of difunctional organo compound, fatty acid moieties, and combinations of these; and
   II) amine reactable organoalkoxy silane selected from the group consisting of the silane and hydrolysis products thereof to yield silylated polyamine polymer with organosilane moieties selected from those that are partially and fully hydrolyzed or hydrolyzable at suitable temperatures and times to form the silylated polyamine polymer.

2. Silylated polyamine polymer of claim 1, wherein the polyamine-containing polymer is selected from the group consisting of:
   a) polyamines having acid moieties from Fatty Acid Material and having free amines, where these are sufficient for at least water dispersibility;
   b) polyamine-polyamides; amidoamine polymers including acylated polyamines;
   c) condensation products selected from condensation products of polyamines with polyfunctional acids, condensation products of polyamines and Fatty Acid Materials, condensation products of polyalkylamines with polyfunctional acids, condensation products of polyamines and Fatty Acid Materials, condensation products of polyamines and Fatty Acid Materials, condensation products of polyethyleneimine with polyfunctional acids, or condensation products of polyamines and Fatty Acid Materials;
   d) amidated polyamines and partially amidated polyalkylenepolyamine with residual amine values in the range of up to about 3000, where the polyamine and polyalkylenepolyamine before amidation can have a molecular weight up to about 50,000 or more;
   e) chain extended polyamines having fatty acid moieties and having free amines;
   f) polyethyleneamines including acylated polyethylamines prepared from linear poly-2-oxazolines with an alkyl substituent at the number 2 position, wherein the alkyl substituent can be of 1 to 17 carbon atoms and the degree of polymerization can be about 8 to 22; and
   g) condensation products of the polyamines and fatty acids and condensation products of the polyamines and fatty acids with other dimer acids which can have as one possible isomeric from the polymer having the following formula:

wherein: R is an aliphatic radical having from about 14 to about 34 carbon atoms; n is an integer ranging from 0 to about 3; and m is in the range of from about 1 to 15.

3. Silylated polyamine polymer of claim 2, wherein the polyamine-containing polymer is a reaction product of polyamines and Fatty Acid Material having at least 7 carbon atoms.

4. Silylated polyamine polymer of claim 2, wherein the polyamine is selected from the group consisting of:
   a) the polyamine has three or more amine groups and has the general formula of an $H_2N-(C_nH_{2n}NH)_x-H$ wherein n can range from about 2 to 6 and x can range from 2 through 6 and can include a minor amount of diamines;

b) alkylene polymine resulting from the reaction of an alkylene dihalide and ammonia;

c) polyalkyleneamines including diethylenetriamine (DETA), triethylenetetramine (TETA), tetraethylenepentamine (TEPA), pentaethylenehexamine (PEHA), dipropylenetriamine (DPTA), tripropylenetetramine (TPTA), tetrapropylenepentamine (TPPA), pentapropylenehexamine (PPHA), dihexmethylenetriamine (DHMTA), present as single compounds or as mixture of isomers, d) an alkyl amine selected from alkyl amines having from 2 to 8 carbon atoms, ethylenediamine, mixtures of polyalkylenepolyamine homologs, polyethylenepolyamines, polyalkylenepolyamines using ethylene and propylene groups that are prepared by condensing ethylene diamine with acrylontirile to form N-cyanoethyl ethylenediamine which can be reduced as by catalytic hydrogenation to form a mixed alkylene polyamine; and e) polyalkyleneimines including polyethyleneimine.

5. Silylated polyamine polymer of claim 2, wherein the Fatty Acid Material is selected from dimerized fatty acid prepared from fatty acids having from 8 to 18 carbon atoms, myristoleic acid, palmitoleic acid, oleic acid, linoleic acid, or linolenic acid.

up to about 50,000 Mw; R is a lower alkyl, R' is selected from carbonyl, alkyl, oxirane or diisocyanate groups; R''' is selected from hydrogen, lower alkylene group having from 1 to 4 carbon atoms, and Q is selected from OR, or halide and R'* is a cleaved oxirane group or a urea functionality from reaction of the isocyanate with the amine, wherein Q is OR or halide when R' is a carbonyl group and Q is halide when R' is a lower alkyl and p=O when R' is an oxirane group; and wherein the polyamine, I, is present in slight excess amount to control the molecular weight, and the reaction is conducted to favor the formation of structure V which has lubricating properties whereas structure IV is non-lubricating, and to keep structure VI to a minimum so unreacted secondary nitrogen groups are available in the reaction product for water solubility of the reaction product.

7. Silylated polyamine polymer of claim 6, wherein I, the polyamine, is $NH_2-(CH_2-CH_2-NH)_3-CH_2-CH_2-NH_2$; and II, difunctional organo compound, is $C_2H_5O(O)C-CH_2-CH_2-C(O)OC_2H_5$ and III, Fatty Acid Material, is $CH_3(CH_2)_6 COOH$ and the reaction is conducted with the sequential addition of II and then III to produce mostly Structure V rather than a mixture, where the reaction can result in a mixture of Structure V depicted below along with derivatives selected from cyclized and branched derivatives;

$$H_2N-C_2H_4-(HN-C_2H_4)_3HN-[\overset{O}{\overset{\|}{C}}-(CH_2)_2-\overset{O}{\overset{\|}{C}}-NH-(C_2H_4-NH)_3-C_2H_4-NH]_z-H$$

$$CH_3(CH_2)_6\overset{O}{\overset{\|}{C}}[NH(C_2H_4NH)_3C_2H_4NH-\overset{O}{\overset{\|}{C}}-(CH_2)_2-\overset{O}{\overset{\|}{C}}]_{\overline{z}}NH(C_2H_4NH)_3C_2H_4NH-\overset{O}{\overset{\|}{C}}-(CH_2)_6CH_3$$

6. Silylated polyamine polymer of claim 1, wherein the polyamine-containing polymer is chain-extended polyamine reacted with Fatty Acid Material and prepared from the following types of reactants in the below-described reactions:

And where Z is equal to 0 the structure can be:

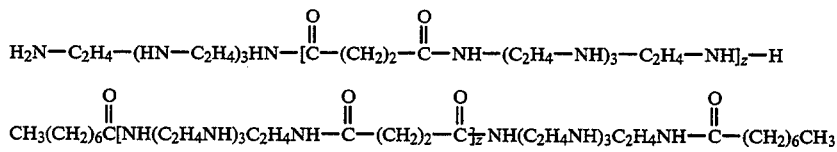

(I)   $NH_2-(R-NH)_x-R-NH_2$ + (II) $(Q)_pR'-R''-R'(Q)_p$ (III) $CH_3-(CH_2)_yCOOH$

↓ mixture of:

(IV)   $H-[NH(R-NH)_x-R-NH-R'^*-R''-R'^*]_z-NH(R-NH)_x-R-NH_2 + (Q)_pH$ (V)   $[CH_3-(CH_2)_y\overset{O}{\overset{\|}{C}}]_{\overline{w}}[NH-(R-NH)_x-R-NH-R'^*-R''-R'^*]_z-NH(R-NH)_x-R-NH_2 + (Q)_pH + H_2O$

+

(VI) is selected from (IV) or (V) with moieties of the repeating unit that involve branching such as one or more of the following:

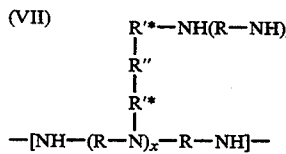

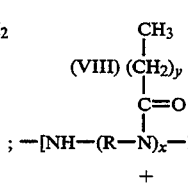

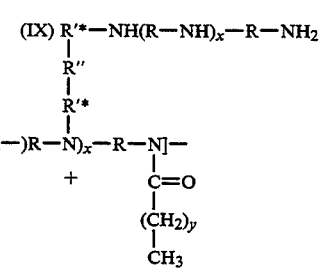

wherein: 1) p, w, x, y and z are integers where p is 1 or 0 and x and y have the values of those for the reactants and w and z have values to provide a molecular weight 8. Silylated polyamine polymer of claim 6, wherein the difunctional organo compounds, I, useful for chain extending are compounds where the difunctional moieties can react with the nitrogen with active hydrogens of a residual amine of the polyamine to form a covalent bond.

9. Silylated polyamine polymer of claim 6, wherein the difunctional organo compounds, I, are selected from the group consisting of: those compounds having at least two of the following functional moieties: carboxylic acid and esters and anhydrides; epoxide, glycidyl or oxirane; halides, including acid chlorides; and isocyanates and suitable mixtures thereof so that the compound is at least dicarboxylic acid, diester, diepoxide, dihalide, diacid chloride or diisocyanate or mixtures thereof, including: difunctional compounds selected from the group consisting of diglycidyl ethers including: bisphenol A diglycidyl ether and butanediol diglycidyl ether, novalac epoxy, dichloroethanes, dichloropropane, dialkylsuccinate, the dicarboxylic acid with a short hydrocarbonyl chain are selected from the group: oxalic acid, malonic acid, succinic acid, glutaric acid, adipic acid, pimelic acid, and those where the length of the carbon atom chain between the difunctional reactable moieties is in the range of about 2 to about 10 and halogenated derivatives of the dicarboxylic acids or the anhydrides or esters of the acids can be used as the chain extenders, and a mixture of this type of chain-extender with fatty acids for condensation reaction with polyamines; and saturated carboxylic acids alone or with a small amount of unsaturated dicarboxylic acids including maleic acid and in admixture with the saturated dicarboxylic acids and dialkyl succinate selected from the group consisting of: diethyl succinate.

10. Silylate polyamine polymer of claim 1, wherein the amine-reactable organo functional silane esters or hydrolysis products thereof have the following formula:

$$X_a\text{—Si(OR)}_b$$

wherein X is an organic radical having an amine-reactable moiety which is one that can react with active hydrogens present on the residual amines which can be wherein the moieties are selected from the group consisting of epoxy, glycidyl groups, isocyanato groups, ester groups, alkyl halo group, and acryloxy groups, wherein in addition to the amine-reactable moiety the radical can be selected from alkyl radicals selected from saturated alkyl radicals having 1 to 6 carbon atoms, cycloalkyl, aryl, or alkaryl radicals containing 6 to 10 carbon atoms, wherein the term "a" is an integer ranging from 1 to 2 and the term "b" is an integer that is equal to 4−a, and wherein the term "R" is a hydrogen alkyl radical having one to six carbon atoms, cycloalkyl, aryl, or alkaryl radicals containing 6 to 10 carbon atoms, or mixtures or hydrogen and one of these organic radicals when "b" is greater than one.

11. Silylated polyamine polymer of claim 1, wherein the amine-reactable organo functional silane esters or hydrolysis products thereof is selected from the group consisting:
a) epoxyorganofunctional silane esters having the general formula: CH2CH(O)—CH2—O—(CH2)$_x$—Si (OR)$_{1-3}$ where x is an integer from 1 to 6 and R is a lower alkyl, selected from, methyl, ethyl, propyl, isopropyl or the formula: CH2CH(O)—C—(CH2)$_z$—si (OR)$_{1-3}$ where z is an integer from 1 to 6, and including gamma-glycidoxyalkyl-trimethoxy silane; gamma-glycidoxyalkyltrialkoxy silane where the alkoxy group can be methoxy or ethoxy; delta glycidoxy butyl trimethoxy silane; and 3,4-epoxy cyclohexylethyltrimethoxy silane; beta-glycidoxyethyltriethosy silane; beta-(3,4-epoxy cyclohexyl) ethyltrimethoxyethosy silane; beta-(3-epoxy ethyl phenyl) ethyltrimethoxy silane; beta-(epoxy ethyl) ethyltriethoxy silane; 4,5-epoxy-n-hexyl trimethoxy silanes; 15,16-epoxy-n-hexadecyl trimethoxy silane; 3-methylene-7-methyl-6-7 epoxy octyltrimethoxy silane;
b) isocyanatoorganofunctional silane esters, including: gamma-isocyanatopropyltriethoxy silane, which has the chemical formula of: O=C=N(CH2)3Si(OC2H5)3; and
c) acryloxy-containing organofunctional silane esters including: gamma-methacryloxypropyltrimethoxysilane, and other acrylatoalkylalkoxysilanes, including gamma-acryloxypropyltrimethoxysilane, methacrylatoalkylalkoxysilane including gamma-methacryloxypropyltrimethoxysilane, gamma-methacryloxypropyltriethoxysilane, and gamma-methacryloxypropyltris(2-ethoxyethoxy)silane.

12. Silylated polyamine polymer of claim 1 wherein the molar ratio of the polyamine-containing polymer with fatty acid moieties to the amine-reactable silane is in the range of about 1 to 0.5 up to 1 to 3.

13. Silylated polyamine polymer of claim 1 wherein the reaction is conducted in the presence of a solvent selected from the group consisting of: lower alkyl alcohols; polyalkylene glycols, which includes polyethylene glycol, polypropylene glycol and mixtures and copolymers thereof and alkyl ethers thereof; ethoxylated alcohols; and water.

14. Silylated polyamine polymer of claim 1, wherein the mixture has a minor amount of unsilylated reaction product from reaction of polyamine and the Fatty Acid Material.

15. Silylated polyamine polymer of one or more polyamine-containing polymers having one or more free amine groups and one or more fatty acids moieties in an effective amount for at least water dispersibility, wherein the polyamine-containing polymer is selected from the group consisting of:
a) polyamines with the acid moieties from fatty acids and dimer acids and free amines;
b) polyamine-polyamides; amidoamine polymers including acylated polyamines;
c) condensation products selected from condensation products of polyamines with polyfunctional acids, condensation products of polyamines with Fatty Acid Materials, condensation products of polyalkylamines with polyfunctional acids, condensation products of polyamines with Fatty Acid Materials, condensation products of polyethyleneimine with polyfunctional acids, and condensation products of polyamines with Fatty Acid Materials;
d) amidated polyamines and partially amidated polyalkylenepolyamine with residual amine values in the range of up to about 3000, where the polyamine and polyalkylenepolyamine before amidation can have a molecular weight up to about 50,000 or more;
e) chain extended polyamines with fatty acid moieties and free amines;

f) polyethyleneamines including acylated polyethylamines prepared from linear poly-2-oxazolines with an alkyl substituent at the number 2 position, wherein the alkyl substituent can be of 1 to 17 carbon atoms and the degree of polymerization can be about 8 to 22; and g) condensation products of the polyamines and fatty acids with or without other dimer acids which can have as one possible isomeric form the polymer having the following formula:

$$H_2N[C_2H_4NH]_nC_2H_4HN[CRCNH(C_2H_4HN)_nC_2H_4NH]_mH,$$

wherein: R is selected from the group consisting of: an aliphatic radical having from about 14 to about 34 carbon atoms, unsaturated cycloaliphatic difunctional radicals containing from about 26 to about 34 carbon atoms; and wherein n is an integer ranging from 0 to about 3; and m is in the range of from about 1 to 15, with at least one amine reactable organoalkoxy silane selected from the group consisting of the silane and hydrolysis products thereof, wherein the amine-reactable organo functional silane esters or hydrolysis products thereof having the following formula:

$$X_a\text{—Si(OR)}_b$$

wherein X is an organic radical having an amine-reactable moiety which is one that can react with active hydrogens present on the residual amines which wherein the moieties are selected from the group consisting of epoxy, glycidyl groups, isocyanato groups, ester groups, and acryloxy groups, wherein in addition to the amine-reactable moiety the radical can be selected from alkyl radicals selected from the group consisting of saturated alkyl radicals having 1 to 6 carbon atoms, cycloalkyl, aryl, and alkaryl radicals containing 6 to 10 carbon atoms, wherein the term "a" is an integer ranging from 1 to 2 and the term "b" is an integer that is equal to 4−a, and wherein the term "R" is a hydrogen; alkyl radical having one to six carbon atoms; cycloalkyl, aryl, and alkaryl radicals containing 6 to 10 carbon atoms; and mixtures of hydrogen and one of these organic radicals when "b" is greater than one.

16. Silylated polyamine polymer of claim 15, wherein the polyamine-containing polymer is a reaction product of polyamines and Fatty Acid Material having at least 7 carbon atoms.

17. Silylated polyamine polymer of claim 15, wherein
A) the polyamine is selected from the group consisting of:
 1) the polyamine can be any material having three or more amine groups and having the general formula of $H_2N\text{—}(C_nH_{2n}NH)_x\text{—}H$ wherein n can range from about 2 to 6 and x can range from 2 through 6 and can include a minor amount of diamines;
 2) alkylene polyamine resulting from the reaction of an alkylene dihalide and ammonia; and
 3) polyalkyleneamines including diethylenetriamine (DETA), triethylenetetramine (TETA), tetraethylenepentamine (TEPA), pentaethylenehexamine (PEHA), dipropylenetriamine (DPTA), tripropylenetetramine (TPTA), tetrapropylenepentamine (TPPA), pentapropylenehexamine (PPHA), and dihexmethylenetriamine (DHMTA), present as single compounds or as a mixture of isomers, and
 4) an alkyl amine having form 2 to 8 carbon atoms, including ethylenediamine, mixtures of polyalkylenepolyamine homologs including polyethylenepolyamines, polyalkylenepolyamines using ethylene and propylene groups that are prepared by condensing ethylene diamine with acrylonitrile to form N-cyanoethyl ethylenediamine which can be reduced as by catalytic hydrogenation to form a mixed alkylene polyamine; and
B) the Fatty Acid Material include:
 1) dimerized fatty acid selected from dimerized fatty acids prepared from fatty acids having from 8 to 18 carbon atoms, myristoleic acid, palmitoleic acid, oleic acid, linoleic acid and linolenic acid; and
C) the polyamine-containing polymer has chain-extended polyamine reacted with Fatty Acid Material and prepared from the following types of reactants in the below-described reactions:

(I) $NH_2\text{—}(R\text{—}NH)_x\text{—}R\text{—}NH_2$ + (II) $(Q)_pR'\text{—}R''\text{—}R'(Q)_p$ (III) $CH_3\text{—}(CH_2)_y COOH$ ⇓ mixture of:

(IV) $H\text{—}[NH(R\text{—}NH)_x\text{—}R\text{—}NH\text{—}R'^*\text{—}R''\text{—}R'^*]_z\text{—}NH(R\text{—}NH)_x\text{—}R\text{—}NH_2 + (Q)_pH$ (V) 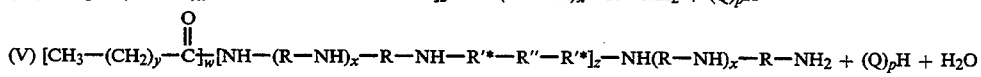 $[CH_3\text{—}(CH_2)_y\text{—}\overset{O}{\overset{\|}{C}}]_w[NH\text{—}(R\text{—}NH)_x\text{—}R\text{—}NH\text{—}R'^*\text{—}R''\text{—}R'^*]_z\text{—}NH(R\text{—}NH)_x\text{—}R\text{—}NH_2 + (Q)_pH + H_2O$ (VI) is selected from (IV) or (V) with moieties of the repeating unit that involve branching for one or more of the following:

```
      R'*—NH(R—NH)x—R—NH2           CH3
      |                             |
      R''                           (CH2)y
      |                             |
      R'*                           C=O
      |                             |
(VII) —[NH—(R—N)x—R—NH]—      ;(VIII)—[NH—(R—N)x—R—NH]—;
                                                +
```

-continued

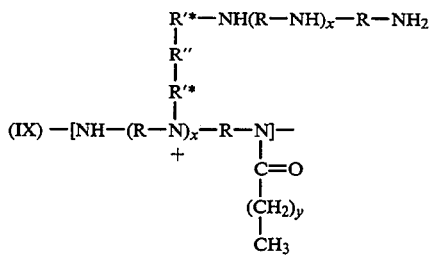

wherein: 1) p, w, x, y and z are integers where p is 1 or 0 and x and y have the values of those for the reactants and w and z have values to provide a molecular weight up to about 10,000; to maintain a reasonable viscosity; R is a lower alkyl, R' is selected from carbonyl, alkyl, oxirane or diisocyanate groups; R''' is selected from hydrogen or lower alkylene group having from 1 to 4 carbon atoms, and Q is selected from OR, or halide and R'* is a cleaved oxirane group or a urea functionality from reaction of the isocyanate with the amine, wherein Q is OR or halide when R' is a carbonyl group and Q is halide when R' is a lower alkyl and p=O when R' is an oxirane group; and wherein the polyamine, I, is present in slight excess amount to control the molecular weight, and the reaction is conducted to favor the formation of structure V which has lubricating properties whereas structure IV is non-lubricating, and to keep structure VI to a minimum so unreacted secondary nitrogen groups are available in the reaction product for water solubility of the reaction product (I) wherein since all the reactants can be liquids, the reaction can be done neat although if the viscosity is too high for any particular reactant or reaction product heating or organic solvents can be present for dilution.

18. Silylated polyamine polymer of claim 17 wherein I is: $NH_2-(CH_2-CH_2-NH)_3-CH_2-CH_2-NH_2$; and II is: $C_2H_5O(O)C-CH_2-CH_2-C(O)OC_2H_5$ and III is: $CH_3(CH_2)_6 COOH$ and the reaction is conducted with the sequential addition of II and then III to produce mostly Structure V rather than a mixture, and the reaction can result in a mixture of Structure V depicted below along with derivatives selected from cyclized or branched derivatives;

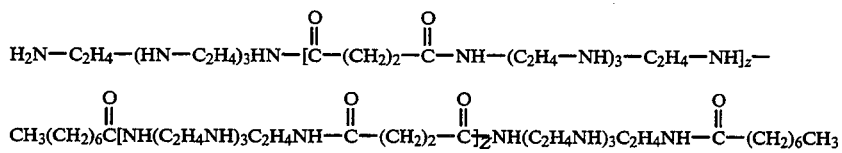

And where Z is equal to 0 the structure can be:

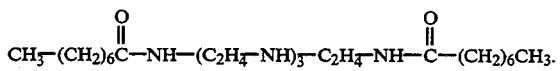

19. Silylated polyamine polymer of claim 17 wherein the difunctional organo compounds useful for chain extending are compounds where the difunctional moieties can react with the nitrogen with active hydrogens of a residual amine of the polyamine to form a covalent bond.

20. Silylated polyamine polymer of claim 17, wherein the difunctional organo compounds, I, are selected from the group consisting of: those compounds having at least two of the following functional moieties: carboxylic acid and esters and anhydrides; epoxide, glycidyl or oxirane; halides, including acid chlorides; and isocyanates and suitable mixtures thereof so that the compound is at least dicarboxylic acid, diester, diepoxide, dihalide, diacid chloride or diisocyanate or mixtures thereof, including: difunctional compounds selected from the group consisting of diglycidyl ethers including bisphenol A diglycidyl ether and butanediol diglycidyl ether, novalac epoxy, dichloroethanes, dichloropropane, dialkylsuccinate, and a mixture of this type of chain extender with fatty acids for condensation reaction with polyamines; and saturated carboxylic acids alone or with a small amount of unsaturated dicarboxylic acids including maleic acid and in admixture with the saturated dicarboxylic acids and dialkyl succinate selected from the group consisting of: diethyl succinate and the length of the carbon atom chain between the difunctional amine reactable moieties is in the range of about 2 to about 10.

21. Silylated polyamine polymer of claim 15 wherein the amine-reactable organo functional silane esters or hydrolysis products thereof is selected from the group consisting:

a) epoxyorganofunctional silane esters having the general formula: $CH_2CH(O)-CH_2-O-(CH_2)_x-Si(OR)_{1-3}$ where x is an integer from 1 to 6 and R is a lower alkyl, for example, methyl, ethyl, propyl, isopropyl or the formula: $CH_2CH(O)-C-(CH_2)_z-si(OR)_{1-3}$ where z is an integer from 1 to 6, and including gamma-glycidoxyalkyl-trimethoxy silane; gamma-glycidoxyalkyltrialkoxy silane where the alkoxy group can be methoxy or ethoxy; delta glycidoxy butyl trimethoxy silane; and 3,4-epoxy cyclohexylethyltrimethoxy silane; beta-glycidoxyethyltriethosy silane; beta-(3,4-epoxy cyclohexyl) ethyltrimethoxyethosy silane; beta-(3-epoxy ethyl phenyl) ethyltrimethoxy silane; beta-(epoxy ethyl) ethyltriethoxy silane; 4,5-epoxy-n-hexyl trimethoxy silanes; 15,16-epoxy-n-hexadecyl trimethoxy silane; 3-methylene-7-methyl-6-7 epoxy octyltrimethoxy silane;

b) isocyanatoorganofunctional silane esters, including: gamma-isocyanatopropyltriethoxy silane, also known by its CAS name as Silane, 3-(Isocyanato)- propyl triethoxy, which has the chemical formula of: O=C=N(CH$_2$)$_3$Si(OC$_2$H$_5$)$_3$; and c) acryloxy-containing organofunctional silane esters including: gamma-methacryloxypropyltrimethoxysilane, and other acrylatoalkylalkoxysilanes, including gamma-acryloxypropyltrimethoxysilane, methacrylato-alkylalkoxysilane including gamma-methacryloxypropyltrimethoxysilane, gamma-methacryloxypropyltriethoxysilane, and gamma-methacryloxypropyltris-(2-ethoxyethoxy)silane.

22. Silylated polyamine polymer of claim 1, present with a predominant amount of water to formulate a chemical treating composition for treating substrates.

23. Silylated polyamine polymer of claim 22, which includes at least one of the components selected from the group of: film-forming polymer, nonionic lubricant, cationic lubricant, antistatic compound, organofunctional coupling agents, waxes, emulsifiers, surfactants, thixotropic agents, anti-foaming agents, and mixtures of any two or more of these.

24. Silylated polyamine polymer of claim 23, wherein the at least one film forming polymer is selected from the group consisting of at least one starch poly(vinylpyrrolidone) homopolymers or copolymers, and polyvinylacetate homopolymer and copolymer.

25. Silylated polyamine polymer of claim 24 that is present on the surface of a substrate selected from the group consisting of polymers, glass, glass fiber, and other metal oxide surfaces.

26. Silylated polyamine polymer of claim 15, present with a predominant amount of water to formulate a chemical treating composition for treating substrates.

27. Silylated polyamine polymer of claim 26, which includes at least one of the components selected from the group of: film-forming polymer, nonionic lubricant, cationic lubricant, antistatic compound, organofunctional coupling agents, waxes, emulsifiers, surfactants, thixotropic agents, anti-foaming agents, and mixtures of any two or more of these.

28. Silylated polyamine polymer of claim 27, wherein the at least one film forming polymer is selected from the group consisting of at least one starch, poly(vinylpyrrolidone) homopolymers or copolymers, and polyvinylacetate homopolymer or copolymer.

29. Silylated polyamine polymer of claim 27 that is present on the surface of a substrate selected from the group consisting of glass and polymers and other metal oxide surfaces and including at least one glass fiber.

30. Silylated polyamine polymer of claim 15 present with:
a) at least one starch in an amount of at least 35 weight percent of the non-aqueous components of the binder present as the predominant film forming material;
b) nonionic lubricant selected from the group consisting of hydrogenated vegetable oil, fatty acid esters of non-polymeric polyhydric alcohols and mineral oils and mixtures thereof where the oil is present in an amount of at least 25 weight percent of the non-aqueous components of the binder and the ratio of oil to starch is greater than 5/12 (0.4) and extends to 1.5;
c) at least one emulsifier for the oil that is present in an effective amount to form an oil-in-water emulsion of the oil:
d) second film former that is other than starch and that provides integrity to the bundle and that is present in an amount ranging from 1 to about 20 weight percent of the non-aqueous components of the binder, where any amount greater than 5 weight percent is present is accompanied with a concomitant reduction in the amount of oil that is present from an amount of 40 weight percent; and
e) water present in an effective amount for application of the binder having a total non-aqueous components in the range of about 1 to about 30 weight percent of the aqueous binder and where the residue of the binder is on glass fiber textile bundles on a loss on ignition basis is in the range of about 0.1 weight percent to about 5 weight percent.

31. Silylated polyamine polymer of claim 16 present with:
a) at least one starch in an amount of at least 35 weight percent of the non-aqueous components of the binder present as the predominant film forming material;
b) nonionic lubricant selected from the group consisting of hydrogenated vegetable oil, fatty acid esters of non-polymeric polyhydric alcohols and mineral oils and mixtures thereof where the oil is present in an amount of at least 25 weight percent of the non-aqueous components of the binder and the ratio of oil to starch is greater than 5/12 (0.4) and extends to 1.5;
c) at least one emulsifier for the oil that is present in an effective amount to form an oil-in-water emulsion of the oil:
d) second film former that is other than starch and that provides integrity to the bundle and that is present in an amount ranging from 1 to about 20 weight percent of the non-aqueous components of the binder, where any amount greater than 5 weight percent is present is accompanied with a concomitant reduction in the amount of oil that is present from an amount of 40 weight percent;
e) wherein the Silylated polymer is a reaction product of polyethyleneimine having from 200 to 800 free amine moieties and diethyl succinate and Fatty Acid Material, and
f) water present in an effective amount for application of the binder having a total non-aqueous components in the range of about 1 to about 30 weight percent of the aqueous binder and where the residue of the binder is on glass fiber textile bundles on a loss on ignition basis is in the range of about 0.1 weight percent to about 5 weight percent.

32. Method of treating fibers with a cationic fiber lubricant which comprises:
a) pre-reacting one or more polyamine-containing polymers having one or more free amine groups and one or more fatty acids moieties in an effective amount for at least water dispersibility and amine reactable organoalkoxy silane selected from the group consisting of the organoalkoxysilane and hydrolysis products thereof to yield the cationic lubricating reaction product with hydrolyzed or hydrolyzable organosilanes;
b) formulating the pre-reacted material with at least water in a predominant amount into a chemical treating composition;
c) applying the formulated composition to the fibers; and
d) gathering the fibers into at least one bundle of fibers.

33. Silylated polyamine polymer of claim 2 wherein the condensation products of the polyamines and fatty acids and condensation products of the polyamines and fatty acids with other dimer acids which can have as one possible isomeric from the polymer having the following formula:

wherein: R is an unsaturated cycloaliphatic divalent radical containing from about 26 to about 34 carbons atoms; n is an integer ranging from 2 to about 3; and m is in the range of about from 1 to 2.

34. Silylated polyamine polymer of claim 1 wherein the reaction of the one or more polyamine-containing polymers and the amine reactable organoalkoxy silane is conducted at a temperature in the range of room temperature to 70° C.

35. Silylated polyamine polymer of claim 1, wherein the reaction is conducted to react most of the silane that is added where the silane is added in a molar ratio of the amine reactable silane to the polyamine containing polymer of not greater than 1:1 and the time ranges from around 15 minutes to 8 hours.

36. Silylated polyamine polymer of claim 1 wherein the reactants are combined at a proper reaction temperature for a period of time with agitation for reaction and the molar ratio of the polyamine to the amine reactable silane generally is in the range of around 1 for the polyamine to around 0.1 to around 25 for the amine reactable silane.

37. Silylated polyamine polymer of claim 3 wherein the polyamine-containing polymer and fatty acid material are reactable at a temperature in the range from room temperature to elevated temperatures, i.e. up to 70° C. for halides and around 130° C. to 200° C. for fatty acids.

38. Silylated polyamine polymer of claim 1 wherein the polyamine is chain-extended at a temperature from around room temperature to around 220° C. where when the chain-extender is a diester the temperature can be from about 80° C. to about 180° C. and where the chain-extender is a diepoxy compound, the temperature can be at or around room temperature and when the chain-extender is a diacid, the temperature can range from around 180° C. to 220° C. at times to accommodate the particular reaction temperature and sufficient to produce a yield of at least water soluble dispersible chain-extended polyamine and where the conditions allow reaction of a substantial portion if not all of the chain-extender.

39. Silylated polyamine polymer of claim 2 wherein the polyamine-containing polymer is selected from the group consisting of: condensation products of the polyamines and fatty acids and condensation products of the polyamines and fatty acids with other dimer acids which can have as one possible isomeric from the polymer having the following formula:

wherein R is an unsaturated cycloaliphatic divalent radicals containing from about 26 to about 34 carbons atoms.

40. Silylated polyamine polymer of claim 1, wherein the silylated polyamine polymer has substrate treatable silylation in the form of hydrolyzable silyl groups to function as coupling agents.

* * * * *

UNITED STATES PATENT AND TRADEMARK OFFICE
CERTIFICATE OF CORRECTION

PATENT NO.    : 5,354,829

DATED         : October 11, 1994

INVENTOR(S)   : Robert G. Swisher, Richard P. Beaver, Robert G. Briody and Louis J. Nehmsmann It is certified that error appears in the above-identified patent and that said Letters Patent is hereby corrected as shown below:

On title page,
Item [54]    change "POLYMERS" to read as --POLYMER--.

column 2, line 19, change "Z'"" to   --I--.

Claim 1, column 24, line 9, insert --,-- after "hydrolyzed" and delete "or";

Claim 1, column 24, lines 26-27, delete "condensation products of polyamines and Fatty Acid Materials"; and Claim 1, column 24, line 35, insert --Mw-- after "50,000".

Claim 4, column 25, line 3, change "polymine" to read as --polyamine--;

Claim 4, column 25, line 12, insert --a-- after "as"; and

Claim 4, column 25, line 18, change "acrylontirile" to read as --acrylonitrile--.

Claim 6, column 25, equation (I), change "mixture of" to be underneath the "R'" in "$Q_pR'$";

Claim 6, column 25, equation (VI), line 2, delete "such as" and insert "for"; and equation (IX), line 7, change ")R-N)$_x$" to read as --(R-N)$_x$--.

Claim 7, column 26, lines 19-20, change "CH-" and "$_2$" to read on the same line.

Claim 10, column 27, line 34, change "Silylate" to read as --Silylated--;

Claim 10, column 27, line 53, insert --,-- after "hydrogen"; and

Claim 10, column 27, line 56, change "or hydrogen" to read as --of hydrogen--.

Claim 11, column 28, line 6, change "thosy" to read as --thoxy--; and

Claim 11, column 28, line 7, change "trimethoxyethosy" to read as --trimethoxyethoxy--.

Claim 13, column 28, lines 33-34, insert "-" after "polyethylene".

Claim 15, column 28, line 65, insert --Mw-- after "50,000".

UNITED STATES PATENT AND TRADEMARK OFFICE
CERTIFICATE OF CORRECTION

PATENT NO. : 5,354,829

DATED : October 11, 1994

INVENTOR(S) : Robert G. Swisher, Richard P. Beaver, Robert G. Briody and Louis J. Nehmsmann It is certified that error appears in the above-identified patent and that said Letters Patent is hereby corrected as shown below:

Claim 17, column 30, line 12, insert --an-- after "of"; and

Claim 17, column 30, line 27, change "form" to read as --from--.

Claim 20, column 32, line 21, insert --:-- after "of";

Claim 20, column 32, line 25, change "chain extender" to read as --chain-extender--; and Claim 20, column 32, line 29, insert --where the alkly is-- after "succinate".

Claim 21, column 32, lines 42-43, change "(CH2" and ")$_z$" to read on the same line;

Claim 21, column 32, line 59, change "yethyltriethosy" to read as --yethyltriethoxy--;

Claim 21, column 32, line 60, change "ethyltrimethoxyethosy" to read as --ethyltrimethoxyethoxy--; and Claim 21, column 33, line 8, change "methacryloxypropyltriethoxysilane," to read as --methacryloxy-propyltriethoxysilane,--.

Claim 24, column 33, line 25, delete "and" after "homopolymer" and insert --or--.

Claim 38, column 36, line 7, delete "." after "80°C" and after "180°C"; and

UNITED STATES PATENT AND TRADEMARK OFFICE
CERTIFICATE OF CORRECTION

PATENT NO. : 5,354,829
DATED : October 11, 1994
INVENTOR(S) : Robert G. Swisher, et al It is certified that error appears in the above-indentified patent and that said Letters Patent is hereby corrected as shown below:

Claim 38, column 36, line 11, delete "." after "180°C" and after "220°C".

Signed and Sealed this

Seventh Day of October, 1997

*Attest:*

BRUCE LEHMAN

*Attesting Officer*    *Commissioner of Patents and Trademarks*